(12) United States Patent
Phillips et al.

(10) Patent No.: US 12,732,462 B2
(45) Date of Patent: Sep. 8, 2026

(54) APPLICATION FLOW-AWARE BROADBAND SERVICE WITH DATA CAPS

(71) Applicant: Adeia Guides Inc., San Jose, CA (US)

(72) Inventors: Christopher Phillips, Hartwell, GA (US); Dhananjay Lal, Englewood, CO (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/626,659

(22) Filed: Apr. 4, 2024

(65) Prior Publication Data

US 2025/0317393 A1 Oct. 9, 2025

(51) Int. Cl.
*H04L 47/12* (2022.01)

(52) U.S. Cl.
CPC .................................... *H04L 47/12* (2013.01)

(58) Field of Classification Search
CPC ............. H04L 47/2441; H04L 12/4633; H04L 12/4641; H04L 47/20; H04L 47/24; H04L 41/0894; H04L 45/64; H04L 47/10; H04L 45/38; H04L 41/5025; H04L 47/22; H04L 47/283; H04L 41/0806; H04L 43/08; H04L 47/32; H04L 41/5054; H04L 43/10; H04L 47/2408; H04L 12/14; H04L 41/5009; H04L 45/04; H04L 45/24; H04L 47/803; H04L 47/824; H04L 63/0428; H04L 63/1425; H04L 41/16; H04L 43/0852;

(Continued)

(56) References Cited

U.S. PATENT DOCUMENTS 10,448,268 B1 10/2019 Jaya et al.
10,686,716 B2 6/2020 Holla et al.
(Continued)

FOREIGN PATENT DOCUMENTS

EP 4120656 A1 1/2023
WO 2024/013545 A1 1/2024

OTHER PUBLICATIONS

Briscoe, B., et al., "Low Latency, Low Loss, and Scalable Throughput (L4S) Internet Service: Architecture RFC 9330", RFC—Informational, (<https://datatracker.ietf.org/doc/rfc9330/>) Jan. 2023 (36 pages).

(Continued)

*Primary Examiner* — Djenane M Bayard
(74) *Attorney, Agent, or Firm* — HG LAW LLP

(57) ABSTRACT

Systems and methods are disclosed for receiving, at a first networking equipment, network traffic over a network, and identifying a portion of the network traffic that corresponds to preferential network traffic, based on an indication from an application service provider or an Internet service provider (ISP). A preferential network traffic data cap for data provided over the network to the first networking equipment over a particular time period may be accessed, and whether an amount of preferential network traffic provided to the first networking equipment over the particular time period that equals or exceeds the preferential network traffic data cap may be determined. Based on determining that the amount of preferential network traffic equals or exceeds the preferential network traffic data cap, the disclosed systems and methods may identify an action to be performed on the portion of the network traffic that corresponds to preferential network traffic.

20 Claims, 21 Drawing Sheets

(58) Field of Classification Search

CPC ............. H04L 43/0882; H04L 43/0888; H04L 43/0894; H04L 45/50; H04L 47/115; H04L 47/125; H04L 63/1458; H04L 63/162; H04L 63/166; H04L 63/20; H04L 63/10; H04L 12/1407; H04L 63/08; H04L 67/51; H04L 63/0236; H04L 41/5003; H04L 67/306; H04L 67/63; H04L 63/0853; H04L 67/34; H04L 41/0876; H04L 51/046; H04L 63/04; H04L 63/0892; H04L 67/145; H04L 67/55; H04L 67/564; H04L 9/32; H04L 9/3247; H04L 41/22; H04L 63/1416; H04L 41/0893; H04W 4/24; H04W 24/08; H04W 4/50; H04W 28/0268; H04W 28/0215; H04W 12/06; H04W 12/08; H04W 84/042; H04W 48/16; H04W 84/12; H04W 28/12; H04W 12/37; H04W 88/06; H04W 28/02; H04W 8/02; H04W 8/18; H04W 84/04; H04W 4/12; H04W 72/0453; H04W 12/00; H04W 12/02; H04W 12/037; H04W 4/02; H04W 4/18; H04W 4/20; H04W 48/14; H04W 8/20; H04W 88/08; H04W 12/088; H04W 8/04; H04W 48/06; H04W 80/04; H04W 24/02; H04W 28/0284; H04W 28/0289; H04W 24/00; H04W 48/02; H04W 48/04

See application file for complete search history.

(56) References Cited

U.S. PATENT DOCUMENTS

| | | | | |
|---|---|---|---|---|
| 11,069,082 | B1 | 7/2021 | Ebrahimi et al. | |
| 11,831,553 | B2 | 11/2023 | Dutta | |
| 11,863,465 | B1 | 1/2024 | Nijim et al. | |
| 12,261,711 | B2 | 3/2025 | Phillips et al. | |
| 2005/0152378 | A1* | 7/2005 | Bango | H04L 47/2475 370/395.21 |
| 2007/0165668 | A1* | 7/2007 | Liu | H04L 47/2433 370/466 |
| 2008/0089237 | A1 | 4/2008 | Molen et al. | |
| 2009/0080433 | A1* | 3/2009 | Wertheimer | H04L 12/12 370/394 |
| 2011/0051695 | A1 | 3/2011 | Dinan | |
| 2011/0270976 | A1 | 11/2011 | Yasuda et al. | |
| 2012/0011252 | A1* | 1/2012 | Alperovitch | H04L 47/2441 709/224 |
| 2013/0100803 | A1 | 4/2013 | Menchaca et al. | |
| 2015/0381514 | A1 | 12/2015 | Word | |
| 2017/0041942 | A1* | 2/2017 | Wallentin | H04W 72/569 |
| 2017/0366467 | A1* | 12/2017 | Martin | H04L 12/4625 |
| 2018/0343206 | A1 | 11/2018 | White et al. | |
| 2020/0028792 | A1 | 1/2020 | Holla et al. | |
| 2020/0245163 | A1 | 7/2020 | Jaya et al. | |
| 2021/0119941 | A1 | 4/2021 | Hoole et al. | |
| 2021/0311844 | A1 | 10/2021 | Daniali | |
| 2023/0171203 | A1 | 6/2023 | Kalam et al. | |
| 2024/0313996 | A1 | 9/2024 | Virag et al. | |
| 2024/0331180 | A1 | 10/2024 | Phillips | |
| 2025/0158926 | A1 | 5/2025 | Zuniga et al. | |
| 2025/0202827 | A1 | 6/2025 | Henry et al. | |
| 2025/0212201 | A1 | 6/2025 | Gupta et al. | |
| 2025/0242236 | A1 | 7/2025 | Phillips et al. | |
| 2025/0317401 | A1 | 10/2025 | Reda et al. | |
| 2025/0317403 | A1 | 10/2025 | Lal et al. | |
| 2026/0005973 | A1 | 1/2026 | Haddad et al. | |
| 2026/0012847 | A1 | 1/2026 | Rossbach et al. | |
| 2026/0089102 | A1 | 3/2026 | Rossbach et al. | |
| 2026/0089103 | A1 | 3/2026 | Rossbach et al. | |

OTHER PUBLICATIONS

Bujlow, T., "Independent comparison of popular DPI tools for traffic classification", Computer Networks, 76:75-89 (2015).

Ericsson, "Enabling time-critical applications over 5G with rate adaptation", Ericsson—Deutsche Telekom White Paper (<https://www.ericsson.com/49bc82/assets/local/reports-papers/white-papers/26052021-enabling-time-critical-applications-over-5g-with-rate-adaptation-whitepaper.pdf>) May 2021 (21 pages).

Huang, Y.F., et al., "Research on QoS Classification of Network Encrypted Traffic Behavior Based on Machine Learning", Electronics , 10(12):1376 Jun. 8, 2021 (24 pages).

Juniper Networks, "Understanding CoS Explicit Congestion Notification," Class of Service User Guide (Routers and EX9200 Switches) (<https://www.juniper.net/documentation/us/en/software/junos/cos/topics/concept/cos-qfx-series-explicit-congestion-notification-understanding.html>) Nov. 29, 2023 (11 pages).

Palmer, C., et al., "Which Internet Service Providers Have Data Caps?", HighspeedInternet.com (<https://www.highspeedinternet.com/resources/which-internet-service-providers-have-data-caps>) Feb. 8, 2023 (21 pages).

Paloalto Networks, "What Is SD-WAN?", Cloud Security (<https://www.paloaltonetworks.com/cyberpedia/what-is-sd-wan>), retrieved on Jul. 9, 2024 (6 pages).

Schepper, K., et al., "Dual Queue Coupled AQM: Deployable Very Low Queuing Delay for All", arXiv:2209.01078, Sep. 2, 2022 (7 pages).

Schepper, K., et al., "Prague Congestion Control", draft-briscoe-iccrg-prague-congestion-control-03, (<https://datatracker.ietf.org/doc/draft-briscoe-iccrg-prague-congestion-control/>) Oct. 14, 2023 (31 pages).

White, G., et al., "Low Latency DOCSIS: Technology Overview", Cable Labs (Registered), (<https://account.cablelabs.com/server/alfresco/0affb960-25f4-44f9-b747-74ad8555fd06>) Feb. 2019 (21 pages).

U.S. Appl. No. 18/626,668, filed Apr. 4, 2024, Dhananjay Lal.

U.S. Appl. No. 18/667,655, filed May 17, 2024, Christopher Phillips.

Briscoe, B., et al., "The DOCSIS(r) Queue Protection Algorithm to Preserve Low Latency", draft-briscoe-docsis-q-protection-07, available online at: <https://datatracker.ietf.org/doc/draft-briscoe-docsis-q-protection/>, Nov. 23, 2023, 37 pages.

Schepper, K. DE., et al., "Dual-Queue Coupled Active Queue Management (AQM) for Low Latency, Low Loss, and Scalable Throughput (L4S)", Internet Engineering Task Force (IETF), available online at: <https://datatracker.ietf.org/doc/html/rfc9332>, Jan. 2023, 52 pages.

Schepper, K. DE., et al., "The Explicit Congestion Notification (ECN) Protocol for Low Latency, Low Loss, and Scalable Throughput (L4S)", RFC 9331, available online at: <https://datatracker.ietf.org/doc/rfc9331/>, Jan. 2023, 52 pages.

U.S. Appl. No. 18/667,655, filed May 17, 2024, title: Intelligent Application Priority Packet Delivery Control. (Not provided; USPTO in possession of specification, claims, and prosecution history).

U.S. Appl. No. 18/744,496, filed Jun. 14, 2024, title: Dynamic Systems and Methods for Media-Aware Low-to Ultralow-Latency, Real-Time Transport Protocol. (Not provided; USPTO in possession of specification, claims, and prosecution history).

U.S. Appl. No. 18/744,547, filed Jun. 14, 2024, title: Dynamic Systems and Methods for Media-Aware Transport of Fragment of Content in Low-Latency, Over-the-Top, and Adaptive Bitrate Streaming. (Not provided; USPTO in possession of specification, claims, and prosecution history).

* cited by examiner

| Binary codepoint | Codepoint name | Meaning |
|---|---|---|
| 00 | Non-ECT | Not ECN-capable transport |
| 01 | ECT (1) | L4S-capable transport |
| 10 | ECT (0) | ECN-capable transport |
| 11 | CE | Congestion experienced |

FIG. 4

RTP/UDP Sender Inside Operator's Network

940 RTP Sender formats data packet for transmission

942 RTP Sender codes the ECN bits for the packet with ECT(0) or ECT(1)

944 RTP Sender transmits RTP packet over UDP socket

946 Network device (home gateway) check ECN marking Src IP, Dest IP to determine if packet originated inside operator's network 948 ECT bits (code) set to 10 ?

Yes

No

950 Perform method defined in FIG. 6

952 ECT bits (code) set to 11 ?

Yes

No

954 Network device sets ECN bits (code) 00

Alternatively the home gateway may set the ECN bits to 10 correcting the error.

956 RTP receiver receives RTP packet

958 Packet data indicates error ?

Yes

APPLICATION FLOW-AWARE BROADBAND SERVICE WITH DATA CAPS

CROSS-REFERENCE TO RELATED APPLICATIONS

The disclosure of commonly owned U.S. patent application Ser. No. 18/626,668, filed Apr. 4, 2024, and entitled "CUSTOMER-CENTRIC, APPLICATION-FLOW AWARE BROADBAND SERVICE," is hereby incorporated by reference herein in its entirety. The disclosure of commonly owned U.S. patent application Ser. No. 18/667,655, filed Apr. 4, 2024, and entitled "INTELLIGENT APPLICATION PRIORITY PACKET DELIVERY CONTROL," is hereby incorporated by reference herein in its entirety.

BACKGROUND

This disclosure is directed to systems and methods for enforcing data caps for preferential network traffic.

SUMMARY

When a network link is congested, latency on the network link generally increases. Traditionally, this has often occurred primarily because of certain congestion control mechanisms utilized by a sender transmitting data on the network link, rather than due to a lack of available capacity on the network link. Such congestion control mechanisms attempt to detect currently available capacity on the network link, to allow the sender to adjust its data transmission rate accordingly. However, such congestion control mechanisms often cause queuing delay, e.g., application service providers often send data too quickly for the network to queue it up.

For example, as stated in Internet Engineering Task Force (IETF), "Low Latency, Low Loss, and Scalable Throughput (L4S) Internet Service: Architecture," RFC 9330 January 2023, (referred to herein as RFC 9330), the contents of which are hereby incorporated by reference herein in their entirety, "queuing remains a major, albeit intermittent, component of latency. For instance, spikes of hundreds of milliseconds are not uncommon, even with state-of-the-art Active Queue Management (AQM) . . . . It has been demonstrated that, once access network bit rates reach levels now common in the developed world, increasing link capacity offers diminishing returns if latency (delay) is not addressed." RFC 9330 further states that "Queuing delay degrades performance intermittently . . . . It occurs i) when a large enough capacity-seeking (e.g., TCP) flow is running alongside the user's traffic in the bottleneck link, which is typically in the access network, or ii) when the low latency application is itself a large capacity-seeking or adaptive rate flow (e.g., interactive video)."

The L4S standard has been introduced to help address these issues. As stated in RFC 9330, "This document describes the L4S architecture, which enables Internet applications to achieve low queuing latency, low congestion loss, and scalable throughput control. L4S is based on the insight that the root cause of queuing delay is in the capacity-seeking congestion controllers of senders, not in the queue itself. With the L4S architecture, all Internet applications could (but do not have to) transition away from congestion control algorithms that cause substantial queuing delay and instead adopt a new class of congestion controls that can seek capacity with very little queuing. These are aided by a modified form of Explicit Congestion Notification (ECN) from the network. With this new architecture, applications can have both low latency and high throughput. The architecture primarily concerns incremental deployment. It defines mechanisms that allow the new class of L4S congestion controls to coexist with 'Classic' congestion controls in a shared network. The aim is for L4S latency and throughput to be usually much better (and rarely worse) while typically not impacting Classic performance."

Traditional single-queue buffering of Internet packets at a network component such as an access network router suffers from Head-of-line (HoL) blocking, effectively making highly latency-sensitive traffic wait in a queue behind less latency-sensitive traffic, which adversely affects the customer's quality of experience (QoE). The L4S mechanism helps address this issue using dual queueing in the wide area network (WAN), with one queue dedicated to low latency packets and the other queue dedicated to classic traffic, and makes reasonable assumptions about performance of network-dependent low latency applications such as gaming, AR/VR, voice, etc. to deliver an improved service.

However, application service providers and/or Internet service providers (ISPs) may decide to mark all of their traffic as L4S-capable, in an effort to minimize latency of their traffic, whether or not such marking is accurate. Moreover, since the dual queuing mechanism of L4S is designed to implement both L4S and non-L4S service flows, it may starve the non-L4S service flow if all application service providers and/or ISPs mark their traffic as L4S.

A further complication is that an ISP may want to accelerate some application-provider-marked L4S-capable traffic based on other considerations, such as a general policy related to Quality-of-Experience (QoE). L4S allows application service providers to mark their traffic as L4S-compliant or L4S-capable. Net neutrality in some jurisdictions might require ISPs to treat traffic marked as L4S-capable from all application service providers in the same manner, regardless of the application service provider. This also creates a situation where application service providers can abuse the network by marking all their traffic using the L4S DiffServ codepoints. While current mechanisms for queue protection allow an ISP to move layer 2 traffic from the preferred (low latency) queue to the non-preferred (classic) queue when a "fairness" policy is violated, this would typically occur only instantaneously, justified based on current traffic patterns and queue congestion, to ensure that the ISP is not intentionally favoring one application service provider's traffic over another's.

Accordingly, there is a need for a mechanism to cause application service providers and/or ISPs to be more selective in terms of how much and which network traffic is to be treated preferentially in at least some circumstances.

To help overcome these issues, systems and methods are provided herein for receiving, at a first networking equipment, network traffic over a network; identifying a portion of the network traffic that corresponds to preferential network traffic over a network, based on an indication from an application service provider or an ISP; accessing a preferential network traffic data cap for data provided over the network to the first networking equipment over a particular period of time; determining whether an amount of preferential network traffic provided to the first networking equipment over the particular time period equals or exceeds the preferential network traffic data cap; and, based on determining that the amount of preferential network traffic provided to the first networking equipment over the particular period of time equals or exceeds the preferential network traffic data cap, causing identification of an action to be performed on the portion of the network traffic that corresponds to preferential network traffic.

Such aspects enable enforcing data caps for preferential traffic (e.g., L4S-capable network traffic marked by an ISP or application service provider as preferential) separately from regular (e.g., non-L4S-capable and/or not marked as preferential by an ISP or application service provider), to control an amount of network traffic that is to be processed in the low latency service flow. This allows subsets of such network traffic to be treated preferentially, while avoiding a situation where too much (or all) traffic is requested to be processed in the low latency service flow, which is desirable because such a situation causes network congestion, which detracts from the improvements provided by L4S. Further, these techniques allow individual application service providers and/or ISPs flexibility in terms of actions to be taken when customers exceed a data cap.

The enforcement of such data caps is likely to motivate application service providers (and/or ISPs and/or subscribers) to adjust priority packet flows based on a true need for ultra low latency and low loss for packet delivery for aspects of the application as opposed to other aspects that might be acceptable without such low latency and low loss of packets. The metering and enforcing data caps for different traffic types (e.g., preferential and non-preferential) may be performed by an ISP based on tonnage at the broadband service subscriber's household. The techniques disclosed herein may minimize queuing for preferential traffic through protection policies.

In some embodiments, the first networking equipment is located at a particular location and provides a local area network (LAN) at the particular location, and second networking equipment is associated with providing a wide area network (WAN). The systems and methods described herein may be further configured to transmit an indication to the second networking equipment indicating that the amount of preferential network traffic equals or exceeds the preferential network traffic data cap, wherein the indication causes the second networking equipment to perform the identification of the action to be performed. In some embodiments, the first networking equipment may comprise a plurality of networking equipment devices, and/or the second networking equipment may comprise a plurality of networking equipment devices.

In some embodiments, the first network equipment is associated with providing a WAN, and the first network equipment causes the identification of the action to be performed.

In some embodiments, identifying the portion of the network traffic that corresponds to preferential network traffic comprises determining whether data associated with the portion of the network traffic comprises bits indicative of the portion of the network traffic being designated as preferential by the application service provider or the ISP.

In some embodiments, the portion of network traffic designated as preferential by the application service provider or the ISP is L4S-capable.

In some embodiments, determining the amount of preferential network traffic provided to the first networking equipment over the particular time period comprises determining an amount of at least one of network traffic designated as preferential by the application service provider or network traffic designated as preferential by the ISP provided to the first networking equipment over the particular time period.

In some embodiments, the portion of the network traffic is designated as preferential by the application service provider; accessing the preferential network traffic data cap for data provided over the network to the first networking equipment comprises accessing an application service provider preferential network traffic data cap for network traffic designated as preferential by the application service provider; and determining whether an amount of preferential network traffic provided to the first networking equipment over the particular time period equals or exceeds the preferential network traffic data cap comprises determining whether an amount of application service provider network traffic designated as preferential provided to the first networking equipment over the particular time period equals or exceeds the application service provider preferential network traffic data cap. In some embodiments, the preferential network traffic (e.g., L4S) data cap associated with the first networking equipment may be applied to a specific application service provider's traffic or to the sum total of all application service providers that mark their traffic as L4S-capable and communicate with the first networking equipment.

In some embodiments, the portion of the network traffic is designated as preferential by the ISP; accessing the preferential network traffic data cap for data provided over the network to the first networking equipment comprises accessing an ISP preferential network traffic data cap for network traffic designated as preferential by the ISP; and determining whether an amount of preferential network traffic provided to the first networking equipment over the particular time period equals or exceeds the preferential network traffic data cap comprises determining whether an amount of ISP network traffic designated as preferential by the ISP provided to the first networking equipment over the particular time period equals or exceeds the ISP preferential network traffic data cap.

In some embodiments, the portion of the network traffic is designated as preferential by the ISP; accessing the preferential network traffic data cap for data provided over the network to the first networking equipment comprises accessing an ISP preferential network traffic data cap for network traffic designated as preferential by the ISP; and determining whether an amount of preferential network traffic provided to the first networking equipment over the particular time period equals or exceeds the preferential network traffic data cap comprises determining whether an amount of ISP network traffic designated as preferential by the ISP provided to the first networking equipment over the particular time period equals or exceeds the ISP preferential network traffic data cap.

In some embodiments, a first queue is provided to process preferential network traffic intended for or transmitted by the first networking equipment, and a second queue is provided to process non-preferential network traffic intended for or transmitted by the first networking equipment; and the identified action comprises modifying the bits to indicate that the portion of the network traffic is non-preferential network traffic, to cause the non-preferential network traffic to be transmitted via the second queue.

In some embodiments, a first queue is provided to process preferential network traffic intended for or transmitted by the first networking equipment, and a second queue is provided to process non-preferential network traffic intended for or transmitted by the first networking equipment; and the identified action comprises maintaining the portion of the network traffic as preferential network traffic, to cause the portion of the network traffic to be transmitted via the first queue.

In some embodiments, the portion of the network traffic is designated as preferential by the ISP; and the method further comprises maintaining the portion of the network traffic as preferential network traffic based on determining that an amount of current network traffic having bits indicative of the ISP designating the current network traffic as preferential is below a threshold.

In some embodiments, the portion of the network traffic is associated with a particular data provider; second networking equipment, associated with providing a wide area network (WAN), is configured to receive an indication from the first networking equipment that the bits do not indicate that the portion of the network traffic is at least one of preferential or experiencing congestion, despite the second networking equipment having caused the bits to indicate that the portion of the network traffic is at least one of preferential or experiencing congestion; and the second networking equipment is configured to, based on receiving the indication from the first networking equipment that the bits do not indicate that the portion of the network traffic is preferential or experiencing congestion, refrain from causing subsequent network traffic from the particular data provider and intended for the first networking equipment to include an indication that the subsequent network traffic is at least one of preferential or experiencing congestion. In some embodiments, if a sender marks packets for L4S-capable, and the receiver does not receive the marked packets due to network equipment along one of the hops dropping the L4S/ECN bits, the receiver's response may be an ECN marking of 00 in the RTCP or acknowledgment/negative acknowledgment (ACK/NACK) packets. In this circumstance, the sender may determine to set the ECN bits to 00 since ECN/L4S is not supported end-to-end.

In some embodiments, determining whether the data associated with the portion of the network traffic comprises bits indicative of the portion of the network traffic being preferential network traffic comprises: based on determining that the bits indicate that the portion of the network traffic is experiencing congestion, identifying a prior packet of the portion of the network traffic, and determining whether the prior packet of the portion of the network traffic comprises bits indicating whether the portion of the network traffic was designated as preferential by the application service provider or the ISP.

In some embodiments, second networking equipment is associated with the ISP and is further configured to: ingest the network traffic; determine whether the portion of the network traffic originated outside of the network of the ISP; based on determining that the portion of the network traffic originated outside of the network of the ISP, determine whether the data associated with the portion of the network traffic comprises, in error, the bits indicative of the portion of the network traffic being preferential network traffic; and based on determining that the data associated with the portion of the network traffic comprises, in error, the bits indicative of the portion of the network traffic being preferential network traffic, modifying the bits to indicate that the portion of the network traffic is non-preferential network traffic.

In some embodiments, the portion of the network traffic that corresponds to preferential network traffic is associated with a cellular network.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 shows illustrative marking of explicit congestion notification (ECN) bits, in accordance with some embodiments of this disclosure.

DETAILED DESCRIPTION

Figure 1:
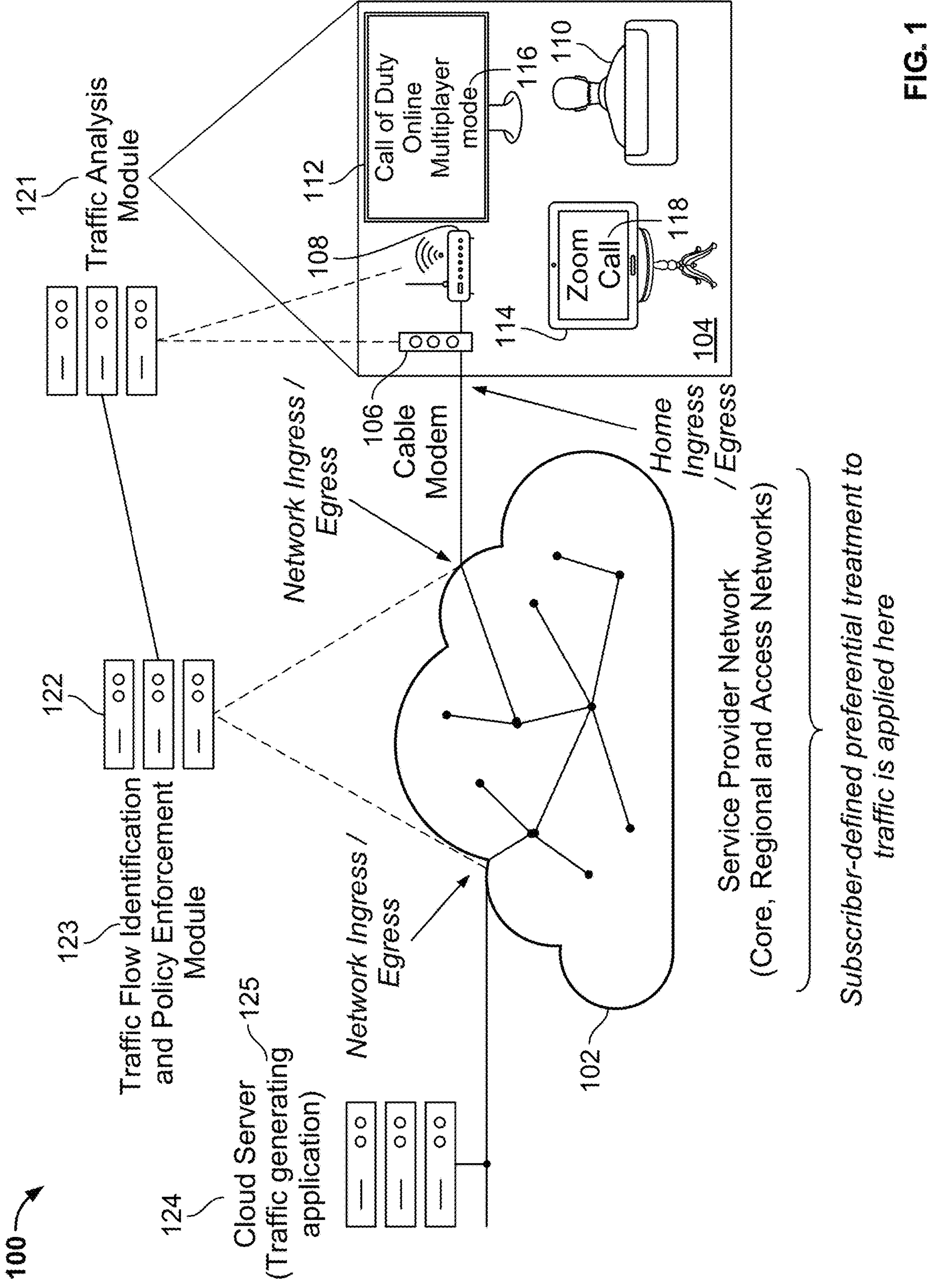
FIG. 1 shows an illustrative architecture for enforcing a data cap for preferential network traffic, in accordance with some embodiments of this disclosure.

FIG. 1 shows an illustrative architecture for a system 100 for enforcing a data cap for preferential network traffic, in accordance with some embodiments of this disclosure. System 100 may comprise service provider network 102, physical location 104 (e.g., a home of user 110, a place of business, a school, or any other suitable location, or any combination thereof), networking equipment 106 and 108 (e.g., a modem, router, switch, gateway, wireless access point, mesh access point, extender, hub, and/or any other suitable networking equipment), devices 112 and 114. In some embodiments, modem 106, router 107 and/or networking equipment 122 may comprise a traffic analysis module 121 and/or a traffic flow identification and policy enforcement module (TIPE) module 123. In some embodiments, cloud server 124 comprises a traffic generating application 125. System 100 may comprise any suitable combination of hardware and/or software to provide the functionalities described herein.

Service provider network 102 may include, for example, any suitable software and/or hardware (e.g., networking equipment, servers, and/or databases) and/or any suitable infrastructure (e.g., physical cable transmission lines, fiber-optic transmission channels or mediums or channels, satellites) to provide core, regional, access networks and/or backhaul (and/or any other suitable portion of the network) of one or more Internet service providers (ISPs), to facilitate a telecommunications network. In some embodiments, the ISP may be provided by a business or other organization that provides access to the Internet for a fee. For example, service provider network 102 may correspond to or comprise a wide area network (WAN), to facilitate Internet connectivity (or connectivity over any other suitable public or private network) between networked devices worldwide or over any other suitable geographic region or location(s), to enable such devices to exchange information and resources. In some embodiments, a WAN or service provider network 102 may be used to connect LANs (and/or other types of communication) to enable electronic communications between remotely located devices. In the example of FIG. 1, the local area network (LAN), e.g., a small scale network for data exchange between a group of computers or other devices at a single location, provided at location 104 by way of networking equipment 106 and/or 108, may not be considered as part of the WAN provided by service provider network 102. Service provider network 102 may provide broadband, high bandwidth Internet access.

In some embodiments, networking equipment 122 and cloud server 124 may be located remote from location 104. The devices, servers, and networking equipment of system 100 may communicate over a wired connection and wireless connection. For example, devices 112, 114 and networking equipment 106 and 108 may be equipped with antennas for transmitting and receiving electromagnetic signals at frequencies within the electromagnetic spectrum, e.g., radio frequencies, to communicate with each other over a network in a localized area. The network within location 104 may correspond to, e.g., a wireless fidelity (Wi-Fi) network, such as, for example, 802.11n, 802.11ac, 802.11ax, Wi-Gig/802.11ad, 802.11 (Wi-Fi 7) at a fronthaul of a telecommunications network, to provide wireless networking technology allowing electronic devices to connect to one another and/or the Internet from a shared network access point.

The devices of system 100 may communicate over a wired LAN and/or may communicate wirelessly over a wireless LAN (WLAN) and to transmit data to and receive data from the Internet, and may be present within an effective coverage area of the localized network. The Internet is a global system of interconnected computer networks and devices employing common communication protocols, e.g., the transmission control protocol (TCP), user datagram protocol (UDP) and the Internet protocol (IP) in the TCP/IP or UDP/IP suite.

Router 108 may be configured to forward or route data packets from the Internet connection, received by way of modem 106, to devices within the localized network of system 100 and receive data packets from such devices. In some embodiments, router 108 may include a built-in modem to provide access to the Internet for the household (e.g., received by way of cable or fiber connections included in backhaul portions of a telecommunications network), built-in switches or hubs to deliver data packets to the appropriate devices within the Wi-Fi network, built-in access points to enable devices to wirelessly connect to the Wi-Fi network, and/or system 100 may include one or more stand-alone modems, switches, routers and access points. In some embodiments, modem 106 and/or router 108 may be leased from and/or installed at location 104 (e.g., the customer's premises) by the ISP as part of a managed Wi-Fi install, to give service network provider 102 visibility into LAN and WAN network traffic associated with data transmitted to or receive from modem 106 of location 104.

In some embodiments, one or more applications and/or media assets may be provided to user 110 by way of wired or wireless signals transmitted through the LAN at location 104. For example, user 110 may be playing a video game 116 (e.g., "Call of Duty") via smart television 116 and/or a video game console, each of which may be connected to the Internet via the LAN within location 104 to provide such video game. As another example, tablet 114 may simultaneously be connected to the Internet via the LAN to provide a video conferencing application (e.g., Zoom) 118 to user 110.

In some embodiments, devices 112 and 114 may be, for example a headset; a mobile device such as, for example, a smartphone or tablet; a laptop computer; a personal computer; a desktop computer; a smart television; a smart watch or wearable device; smart glasses; extended reality (XR) head-mounted display (HMD); a stereoscopic display; a wearable camera; XR glasses; XR goggles; a near-eye display device; a robot; an autonomous cleaning device; or any other suitable user equipment or device capable of connecting to the Internet or other suitable network; or any combination thereof.

In some embodiments, traffic analysis module 121 and TIPE module 123 may be implemented in conjunction to achieve one of more of the functionalities described herein. For example, traffic analysis module 121 may compute results of network traffic analysis in the LAN and/or WAN in real-time for a subscriber home (e.g., at location 104) and/or perform a metering function with respect to preferential and/or non-preferential network traffic, and TIPE module 123 may be configured to apply a policy when a data cap is met, based on an indication received from traffic analysis module 121.

Figures 2A, 2B:
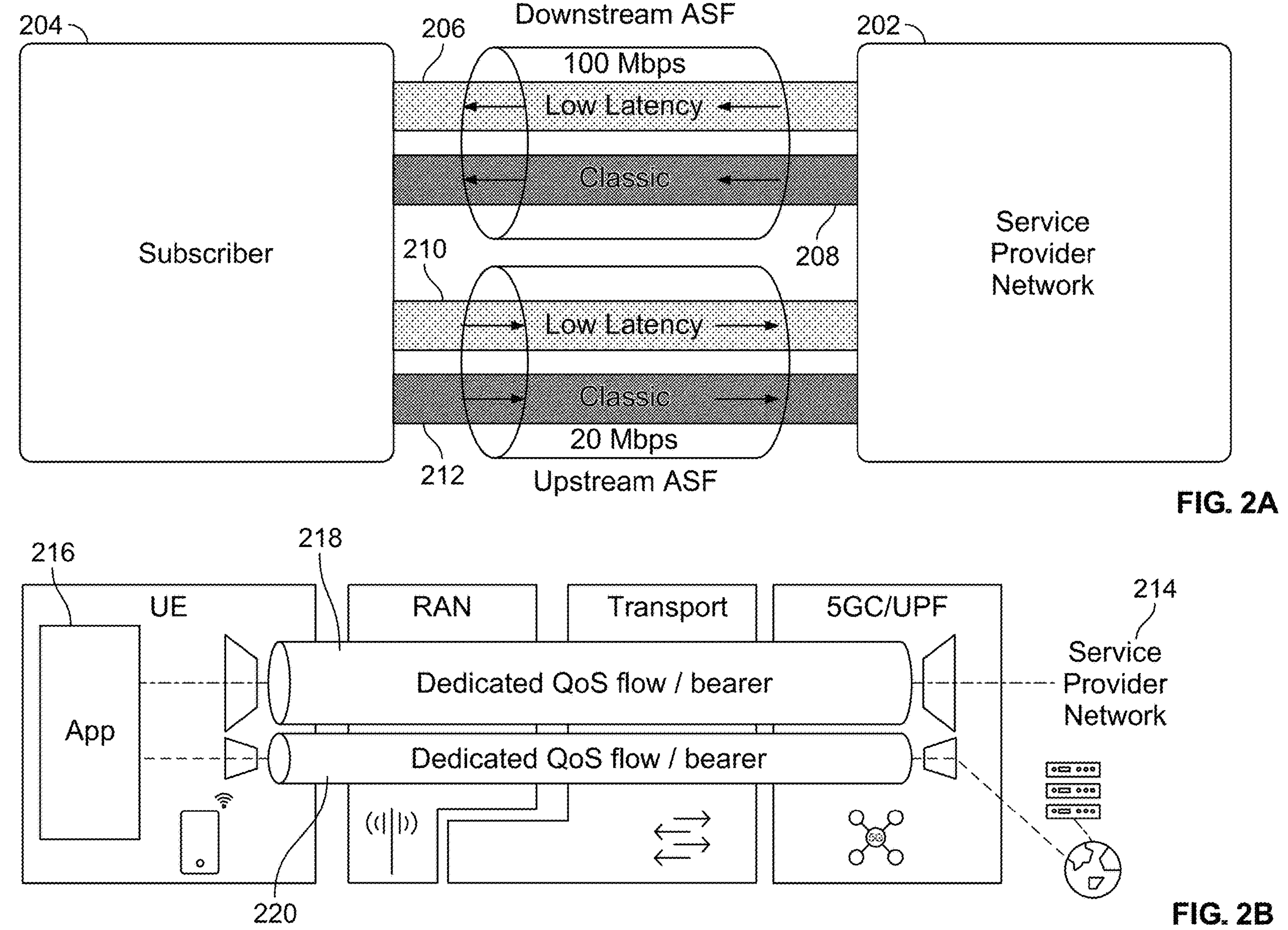
FIGS. 2A-2B show illustrative block diagrams for providing a dual queue service configuration, in accordance with some embodiments of this disclosure.

FIGS. 2A-2B show illustrative block diagrams for providing a dual queue service configuration, in accordance with some embodiments of this disclosure. System 100 may provide (e.g., in the WAN) a queue for low latency (e.g., L4S) network traffic and a queue for classic traffic, based at least in part using networking equipment 122 of FIG. 1. For example, the low latency queue of system 100 may be associated with low latency service flow 206 and low latency service flow 210, and the classic queue of system 100 may be associated with classic queue of service flow 208 and 212, as discussed in more detail in as White et al., "Low Latency DOCSIS: Technology Overview," Cable Labs, 2019 Fall Technical Forum SCTE-ISBE (hereinafter "White et al.), the contents of which are hereby incorporated by reference herein in their entirety. An downstream aggregate service flow (ASF) over service flow 206, 210 between subscriber 204 and service provider network 202 may include low latency service flow 206 and classic service flow 210, and an upstream ASF between subscriber 204 and service provider network 202 may include low latency service flow 210 and classic service flow 212. In some embodiments, networking equipment modem 106, modem 106 and/or router 108 108 and/or other networking equipment may provide one or more buffers or other suitable memory at which the low latency queue and the classic queue may be stored. In some embodiments, system 100 may employ per-flow queues and/or per-flow AQMs, in addition to or in the alternative to dual-queuing.

In some embodiments, service provider network 202 may correspond to service provider network 102 of FIG. 1, networking equipment modem 106 and/or router 108, and subscriber 204 may correspond to networking equipment 106, 108 of user 110 at location 104 of FIG. 1. FIG. 2B may correspond to an architecture for a cellular network, and service provider network 214 which may correspond to service provider network 102 of FIG. 1, and client device or user equipment 216 may correspond to service provider network 102 of FIG. 1, networking equipment 122 and/or cloud server 124.

L4S provides an end-to-end solution to provide certain traffic flows, such as, for example, gaming or voice, with reduced latency. With L4S, the data source and/or data recipient may execute congestion control algorithms to efficiently utilize available capacity while minimizing latency and packet loss, where the data source may use congestion feedback received from the recipient to optimize data transmission. With L4S, the header of an IP packet may indicate, via an explicit congestion notification (ECN), whether the IP packet supports L4S and whether congestion is being experienced, e.g., marking specific packets as having queuing delay that exceeds a threshold. L4S may be implemented at the transport layer by the service provider network and/or application service providers at client and server. In some embodiments, L4S may be enabled by operating system (OS) providers, such as, for example, Google and Apple.

As stated in RFC 9330, "The Dual-Queue Coupled AQM . . . acts like a 'semi-permeable' membrane that partitions latency but not bandwidth. As such, the two queues are for transitioning from Classic to L4S behaviour, not bandwidth prioritization." RFC 9330 further states that "Two separate queues are used to isolate L4S queuing delay from the larger queue that Classic traffic needs to maintain full utilization" and "The two queues act as if they are a single pool of bandwidth in which flows of either type get roughly equal throughput without the scheduler needing to identify any flows."

RFC 9330 further states that "the scheduler can serve the L4S queue with priority (denoted by the '1' on the higher priority input), because the L4S traffic isn't offering up enough traffic to use all the priority that it is given. Therefore, for latency isolation on short timescales (sub-round-trip), the prioritization of the L4S queue protects its low latency by allowing bursts to dissipate quickly; but for bandwidth pooling on longer timescales (round-trip and longer), the Classic queue creates an equal and opposite pressure against the L4S traffic to ensure that neither has priority when it comes to bandwidth—the tension between prioritizing L4S and coupling the marking from the Classic AQM results in approximate per-flow fairness."

As further stated in White et al., AQM can ensure that the Classic queue is not starved: "To enable the Low Latency Queue to rapidly dequeue an arrived burst of traffic, the Inter-Service-Flow scheduler gives a higher weight to the Low Latency Queue than it does to the Classic Queue. The coupling to the Low Latency AQM counterbalances the weighted scheduler by making low-latency applications leave space for Classic traffic. This ensures that the weighted scheduler does not give priority over bandwidth, as a traditional weighted scheduler would." Further, as stated in Internet Engineering Task Force (IETF), "Dual-Queue Coupled Active Queue Management (AQM) for Low Latency, Low Loss, and Scalable Throughput (L4S)," RFC 9332 January 2023, (referred to herein as RFC 9332), the contents of which are hereby incorporated by reference herein in their entirety: "The scheduling weight of the Classic queue should be small (e.g., 1/16) . . . if L4S traffic is over-aggressive or unresponsive, the scheduler weight for Classic traffic will at least be large enough to ensure it does not starve in the short term" and "The scheduler draining the two queues MUST give L4S packets priority over Classic, although priority MUST be bounded in order not to starve Classic traffic" and "The L4S queue has latency priority within sub-round-trip timescales, but over longer periods the coupling from the Classic to the L4S AQM . . . ensures that it does not have bandwidth priority over the Classic queue."

As described in more detail below, system 100 may be configured to deliver a customized broadband to a customer (e.g., user 110 of FIG. 1) based on received user input. For example, system 100 may orchestrate network flows such that customer-specified traffic (e.g., assuming the traffic is L4S-capable) is directed to the low latency service flow associated with the low latency queue, and/or that traffic that is not customer specified (e.g., whether L4S-capable or not L4S-capable) is directed to the classic service flow. In some embodiments, any traffic that is L4S is directed to the low latency service flow (regardless of whether the traffic is specified by the user as preferred), or only traffic that is both specified by the user and that is L4S-capable is directed to the low latency service flow. Such directing of traffic to the low latency service flow based on user input gives the user some measure of control to cause certain packets to be processed with minimal delay, e.g., by shifting a portion of network traffic indicated by the customer as high importance to a low latency service flow or dedicated quality of service (QOS) service flow while keeping the remaining traffic in the classic or default QoS service flow. For example, as part of the L4S mechanism, system 100 may facilitate L4S packets being given latency priority over classic packets for at least certain periods of time, to minimize latency for such packets. In some embodiments, system 100 may use L4S in conjunction with one or more other techniques, e.g., Differentiated services (Diffserv), to forward packets via low latency service flow at the expense of packets over the classic service flow. In some embodiments, if a particular traffic flow is not L4S-capable, based on receiving selection of a particular traffic flow by a user, system 100 may cause an ISP and/or application service provider to be informed of the request, which may cause the ISP and/or application service provider to configure the network traffic to be L4S-capable. In some embodiments, system 100 may receive or transmit API calls requesting that an ISP or application service provider enables L4S for certain network traffic, e.g., user-specified traffic.

FIG. 4 shows illustrative marking of explicit congestion notification (ECN) bits, in accordance with some embodiments of this disclosure. In some embodiments, to determine whether a packet should be assigned to a low latency service flow (e.g., 206, 210, 218 of FIGS. 2A-2B), ISPs and application service providers of low latency traffic (e.g., cloud gaming) of system 100 may mark portions of their traffic with a codepoint, e.g., a differentiated services (DiffServ) codepoint or any other suitable codepoint. This codepoint indicates the ISP's and/or application service provider's ability to perform scalable congestion control, e.g., to respond to a congestion notification in a graceful manner that does not aggressively reduce throughput. For example, the ISP or application service provider may use the DiffServ field information to shift a packet to the low latency service flow in a "weakest link" of the network, such as, for example, the access network. In some embodiments, the ISP or application service provider may signal congestion using an ECN field when appropriate, to produce a graceful degradation in throughput from the application service provider's server. In some embodiments, an ISP and/or application service provider may allow a customer to indicate that network traffic to a particular device and/or for a particular application, e.g., based on a particular service type associated with the application, should be provided with latency priority, e.g., assigned to the low latency service flow.

In some embodiments, ECN may be contained within the DiffServ codepoint to indicate whether or not congestion is experienced by marking the two least-significant bits in the DiffServ in the IP header identifying a data packet. For example, the most significant six bits in the DiffServ field may contain the differentiated services code Point (DSCP) bits, and the state of the two ECN bits indicates whether or not the packet is an ECN-capable packet and whether or not congestion has been experienced. A sender of network traffic may indicate a packet as ECN-capable or non-ECN-capable based on whether the sender is ECN-capable. If an ECN-capable packet experiences congestion at the egress queue of a switch, router, and/or other network component, such switch, router, and/or other network component may mark the packet as experiencing congestion. When the packet reaches the ECN-capable receiver (destination endpoint), the receiver echoes the congestion indicator to the sender (source endpoint) by sending a packet marked to indicate congestion, and after receiving the congestion indicator from the receiver, the source endpoint reduces the transmission rate to relieve the congestion," as described in "Understanding CoS Explicit Congestion Notification," Juniper Product and Release Support, Nov. 29, 2023, the contents of which are hereby incorporated by reference herein in their entirety.

As shown in FIG. 4, in some embodiments, two ECN bits in the DiffServ field provide four codes that determine if a packet is marked as an ECN-capable transport (ECT) packet, meaning that both endpoints of the transport protocol are ECN-capable, and if there is congestion experienced (CE). Historically, codes 01 and 10 had the same meaning, namely that the sending and receiving endpoints of the transport protocol are ECN-capable, and there was no difference between these codes. Recent work, however, earmarks ECT (1) as the bit pattern for L4S-capable traffic. System 100 may modify such interpretation of the ECN bits by assigning distinct meanings to ECT(0) and ECT(1) in order to designate at least two different traffic classes. In some embodiments, ECT(1), e.g., bit pattern 01, may be used to indicate L4S-capable traffic, and ECT(0), e.g., bit pattern 10, may be used to indicate that the sender is capable of receiving explicit congestion notification (though the sender may not be compliant with L4S). In some embodiments, L4S-capable traffic marked by an application server is assigned to ECT(1) and L4S-capable traffic marked by an ISP (e.g., based on customer preferences) is assigned to ECT(0). For example, ECT(0) is used as an internal reference for network traffic that is designated as preferential by the ISP rather than the application provider. In some embodiments, ISPs can independently choose which bit combination represents one of the two classes described above, or multiple ISPs can agree on the definition and/or choice of ECT(0) and ECT(1). In some embodiments, system 100 may add one or more extra bits to be added, specifically to indicate whether such a data packet having such bits was marked by an ISP operator or application service provider providing L4S enablement.

In some embodiments, the same bits that are used for designating whether the client-server are ECN-capable may also be used for marking whether congestion is actually experienced in the network (bits 11: CE). Thus, if a packet has the ECN bits marked as CE, then, in order to classify it as either marked by the application service provider or by the ISP (to meter the traffic accurately and apply policy), the ISP may perform a lookup of that flow identifier (ID) from a prior packet belonging to the same network traffic flow to check its traffic class, to determine whether the sender packet was marked with 10 or 01.

Figure 5:
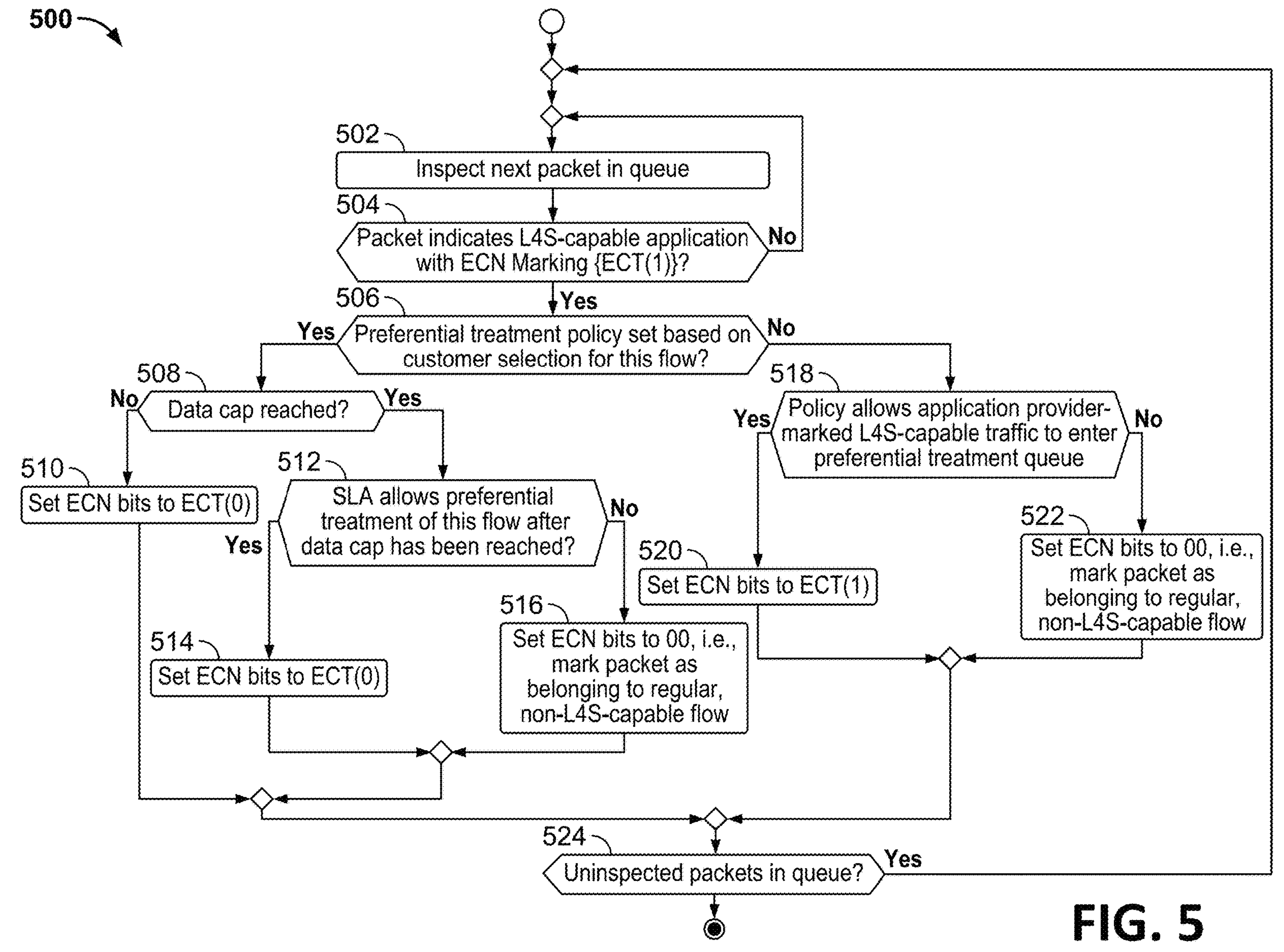
FIG. 5 shows an illustrative flowchart for metering and data cap policy enforcement at an edge router or WAN networking equipment.

FIG. 5 shows an illustrative flowchart 500 for metering and data cap policy enforcement at an edge router or WAN networking equipment, in accordance with some embodiments of this disclosure. In various embodiments, the individual steps of process 500 may be implemented by one or more components of the devices, methods, and systems of FIGS. 1-4 and 6-12 and may be performed in combination with any of the other processes and aspects described herein. Although the present disclosure may describe certain steps of process 500 (and of other processes described herein) as being implemented by certain components of the devices, methods, and systems of 1-4 and 6-12, this is for purposes of illustration only, and it should be understood that other components of the devices, methods, and systems of 1-4 and 6-12 may implement those steps instead. In some embodiments, system 100 (e.g., traffic analysis module 121 and/or TIPE module 123 and/or other suitable combination of hardware and software components) may be configured to perform the method of FIG. 5.

In some embodiments, system 100 may deliver customized broadband to a customer (e.g., user 110 of FIG. 1). For example, system 100 may orchestrate network flows such that customer preferred traffic and/or certain traffic specified by an application service provider is treated as higher priority than the other traffic, such as, for example, by shifting a portion of network traffic indicated by the customer as high importance to a low latency service flow or dedicated quality of service (QoS) service flow (e.g., queue of service flow 206, 210, and/or 218 of FIGS. 2A-2B), while keeping the remaining traffic in the classic or default QoS service flow (e.g., queue of service flow 208, 212, and/or 220 of FIGS. 2A-2B).

In some embodiments, system 100 (e.g., traffic analysis module 121 and/or TIPE module 123) may be configured to enforce data caps for customer-preferred traffic or for application provider-marked traffic separately from regular (non-L4S-capable) traffic. For example, system 100 (e.g., traffic analysis module 121 and/or TIPE module 123) may perform metering of multiple different network traffic classes, e.g., customer-preferred L4S-capable traffic, application service provider-marked but non-customer-preferred L4S-capable traffic, non-L4S-capable traffic, and/or any other suitable network traffic. In some embodiments, system 100 may perform metering of network traffic (e.g., using traffic analysis module 121 of FIG. 1) to measure the tonnage of each of these network traffic classes at the subscriber (home) level.

In the example of FIG. 5, packets in the traffic class that is L4S-capable and customer preferred may be denoted as having ECN bits ECT(0), which may be used by the ISP as an internal reference, and the packets in the traffic class that is L4S-capable marked by an application service provider, but not customer preferred, may be denoted as having ECN bits ECT(1). As shown in FIG. 5, for accurate metering of the (e.g., three) traffic classes, a router at the edge of the ISP network (e.g., executing the TIPE module 123) may perform one or more modifications to ECN bits in the DiffServ field of the IP Header.

At 502, system 100 (e.g., TIPE module 123 executing at least in part at service provider network 102) may inspect a next data packet in a queue, to check whether such data packet is marked as L4S-capable, e.g., whether ECN bits are in ECT(1) configuration. At 504, system 100 (e.g., TIPE module 123) may determine, based on the inspection at 502, whether the data packet is L4S-capable. If so, processing may proceed to 506; otherwise processing may return to 502. At 506, if system 100 (e.g., TIPE module 123) determines, at 504, that the data packet is L4S-capable, then networking equipment (e.g., router 122 of FIG. 1) may use a flow ID, e.g., 5-tuple{IP address(source, destination), protocol, port(source, destination)} to determine whether the customer has set preferential treatment for this application flow, where such preferential treatment may have been set based on, for example, the techniques described in the above-mentioned commonly owned application.

At 508, after determining at 506 that the customer has configured this type of network traffic flow as preferred, system 100 (e.g., TIPE module 123) subsequently checks whether a data cap (e.g., a preferential data cap) has already been reached. In some embodiments, the data cap may be enforced based at least in part on a timing policy, e.g., a daily limit, a weekly limit, a monthly limit, an annual limit, or a limit over any other suitable period of time. In some embodiments, this information may be provided via an explicit message, sent from traffic analysis module 121 sent from a home gateway, cable modem (CM), and/or router to an edge router (e.g., at which TIPE module 123 may be executed at least in part) when a data cap is attained. Based on determining, at 508, that a data cap has not been attained, system 100 (e.g., TIPE module 123) may, at 510, set the ECN bits to ECT(0), to indicate that this packet belongs to a traffic class that is designated by the ISP as preferential.

On the other hand, if system 100 (e.g., TIPE module 123) determines at 508 that the data cap has been attained, system 100 may perform one or more actions, e.g., based at least in part on a business rule in a service-level agreement (SLA) between the subscriber and the ISP. For example, if system 100 (e.g., TIPE module 123) determines, at 512, that the customer SLA permits this traffic flow to continue to use the low latency queue after meeting or exceeding the data cap, then the ECN bits may be set to ECT(0) at 514. On the other hand, after determining at 512 that the application network traffic flow is no longer allowed to be in the priority lane after the data cap has been attained, then system 100 (e.g., TIPE module 123) clears, at 516, the ECN bits by setting the ECN bits to 00, to mark the packet as belonging to a regular, non-L4S-capable flow. In some embodiments, this action is equivalent to "bleaching" the ECN bits once the data cap(s) have been met or exceeded.

At 518, after determining at 506 that the packet does not belong to a flow ID that has been marked as preferred by the customer, system 100 (e.g., TIPE module 123) may make another policy decision. Based on determining that a policy indicates that the application service provider-marked L4S-capable traffic to enter the low latency queue, system 100 (e.g., TIPE module 123) may, at 520, set the ECN bits to ECT(1) to indicate that this packet belongs to a traffic class of application service provider-marked L4S-capable traffic, albeit not customer-preferred L4S-capable traffic. Alternately, a negative determination at 518 may cause system 100 (e.g., TIPE module 123) to, at 522, "bleach" the ECN bits because an internal policy (e.g., of the ISP) is to neither meter, nor provide preferential treatment to, application service provider-marked L4S-capable traffic, but instead to treat the packet as belonging to regular, non-L4S-capable network traffic flow. At 524, if one or more uninspected packets are determined to be in the queue, processing may return to 502 to process such packet(s). In some embodiments, at 524, system 100 may process the packet, inspected at 502 and subsequently processed at 504-522, or any suitable subset thereof, to use a first queue (e.g., a low latency queue of service flow 206, 210 for L4S-capable traffic) to transmit or receive the data packet if the data packet comprises a header with ECN bits set to ECT(0) or ECT(1), or may use a second queue (e.g., classic queue of service flow 208, 212 for non-L4S-capable traffic) if the data packet comprises a header with ECN bits set to 00.

Figure 6:
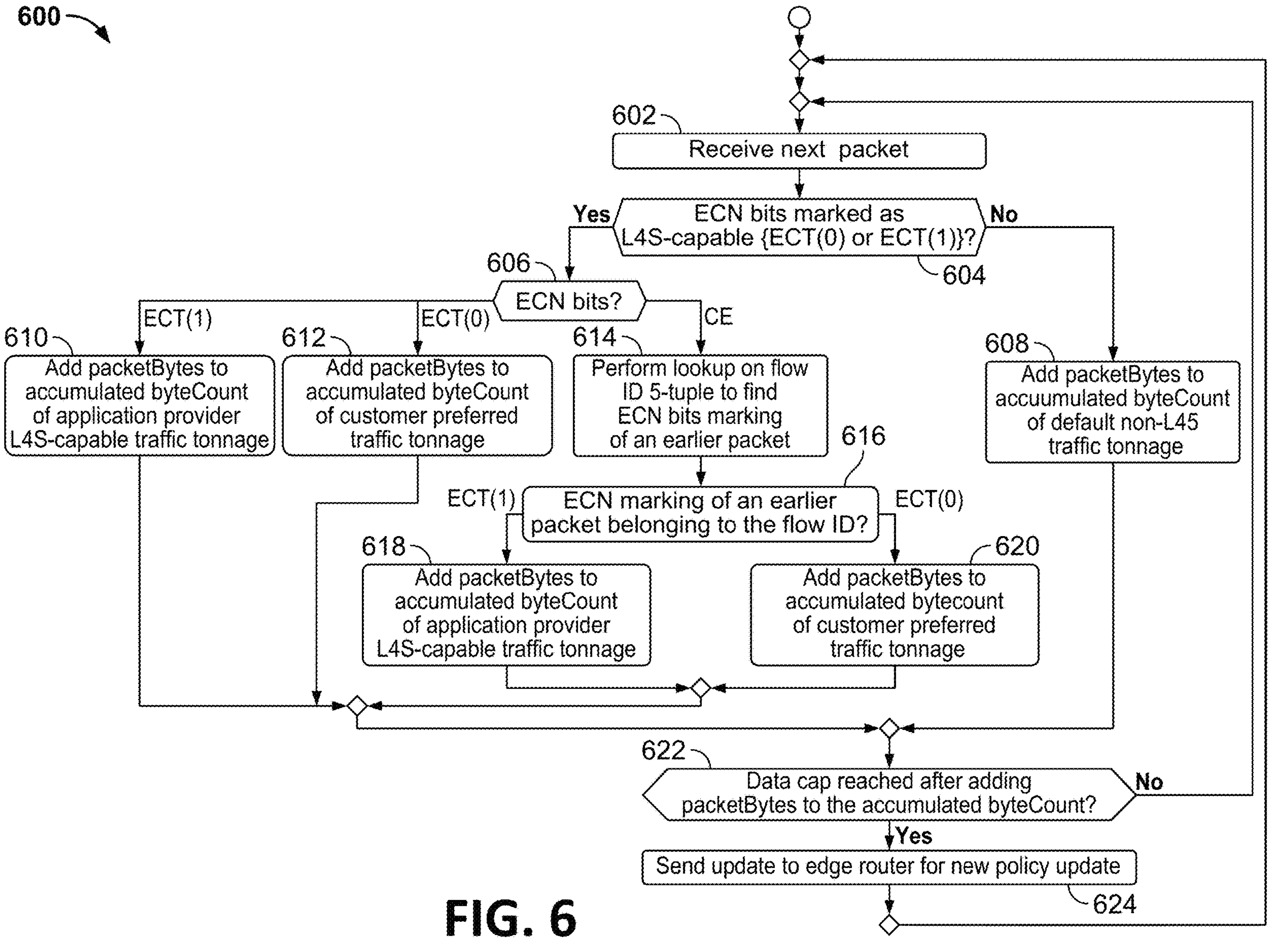
FIG. 6 shows an illustrative flowchart. 6 shows an illustrative flowchart 600 for metering and data cap policy enforcement at the subscriber/home gateway level, in accordance with some embodiments of this disclosure.

FIG. 6 shows an illustrative flowchart 600 for metering and data cap policy enforcement at the subscriber/home gateway level, in accordance with some embodiments of this disclosure. In various embodiments, the individual steps of process 600 may be implemented by one or more components of the devices, methods, and systems of FIGS. 1-5 and 7-14 and may be performed in combination with any of the other processes and aspects described herein. Although the present disclosure may describe certain steps of process 600 (and of other processes described herein) as being implemented by certain components of the devices, methods, and systems of FIGS. 1-5 and 7-14, this is for purposes of illustration only, and it should be understood that other components of the devices, methods, and systems of FIGS. 1-5 and 7-14 may implement those steps instead. In some embodiments, system 100 (e.g., traffic analysis module 121 and/or TIPE module 123 and/or other suitable combination of hardware and software components) may be configured to perform the method of FIG. 6.

Based on receiving one or more packets of network traffic at 602, system 100 (e.g., traffic analysis module 121 of FIG. 1) may, at 604, check whether the ECN bits of such network packet are marked as L4S-capable, e.g., comprise an indication of ECT(0) or ECT(1). Based on determining that the ECN bits of such network packet are marked, processing may proceed to 606; otherwise processing may proceed to 608. At 606, based on determining that ECN bits of such packet are marked with ECT(1), processing may proceed to 610, or based on determining that ECN bits of the network packet are marked with ECT(0), processing may proceed to 612. At 610, since ECT(1) is marked, system 100 (e.g., traffic analysis module 121 of FIG. 1) adds "packetBytes" to an accumulated value of "byteCount" of application service provider-marked L4S-capable traffic tonnage. At 612, since ECT(0) is marked, system 100 (e.g., traffic analysis module 121 of FIG. 1) adds "packetBytes" to an accumulated value of "byteCount" of ISP-marked customer-preferred L4S-capable traffic tonnage.

On the other hand, if at 606, the system determines that the ECN bits are marked with an indication (e.g., 11) indicating congestion is being experienced, system 100 (e.g., traffic analysis module 121 of FIG. 1) uses, at 614, the network traffic flow ID 5-tuple to determine a marking of ECN bits of a prior packet belonging to the same network traffic flow ID, e.g., to determine whether this flow was application service provider-marked or ISP-marked as customer-preferred. In some embodiments, ECN bits marked with 11 is an indication that the network traffic should be treated preferentially. Based on determining, at 616, that the earlier or prior packet included a bit marking of ECT(1), processing may proceed to 618. On the other hand, based on determining, at 616, that the earlier or prior packet included a bit marking of ECT(0), processing may proceed to 620. At 618, since ECT(1) is marked, system 100 (e.g., traffic analysis module 121 of FIG. 1) adds "packetBytes" to an accumulated value of "byteCount" of application service provider-marked L4S-capable traffic tonnage. At 620, since ECT(0) is marked, system 100 (e.g., traffic analysis module 121 of FIG. 1) adds "packetBytes" to an accumulated value of "byteCount" of ISP-marked customer-preferred L4S-capable traffic tonnage. Accordingly, the metering function increments the appropriate accumulated "byteCount" variable using the "packetBytes" of the current packet.

If system 100 (e.g., traffic analysis module 121) determines at 604 that the ECN bits are not marked as L4S-capable, processing may proceed to 608. For example, if the ECN bits in the packet indicate that it is not L4S-capable traffic, then the "byteCount" of the non-L4S traffic tonnage is incremented by the 'packetBytes.'" At 622, system 100 (e.g., traffic analysis module 121) determines whether the data cap has been reached (or exceeded) after adding packetBytes to the accumulated byteCount. An affirmative determination at 622 causes processing to proceed to 624; otherwise processing may return to 602. At 624, as the accumulated value of each of the "byteCount" variables attains or exceeds the data cap value, then an indication or message is sent to the TIPE module 123 at networking equipment 122 (e.g., an edge router), and TIPE module 123, based on receiving this indication or message, may enforce a new policy that is in force within the ISP network when a data cap(s) is reached. For example, TIPE module 123 may perform one or more of the techniques described at 512-516 or 518-522 in relation to performing an action related to an SLA or policy when one or more data caps are reached.

In some embodiments, in FIGS. 5-6, an ISP may implement metering for three or more (or any other suitable number of) traffic classes, or it may implement metering for a subset of such traffic classes, and the ISP may change the ECN bits accordingly. For example, if an ISP is implementing metering for only customer-preferred traffic because it has implemented dual-queuing policies for only customer preferred traffic to be sent to the low latency queue, the ISP can "bleach" the ECN bits from all L4S-capable application service provider-marked traffic that is not customer-preferred. Conversely, if the ISP is implementing metering and dual queuing only for application service provider-marked L4S-capable traffic vs. non-L4S-capable traffic, specifically for enforcing data caps on the L4S-capable prioritized traffic, the ISP may not mark any traffic within its network and may ensure that the application service provider-marked traffic is not "bleached" by a network router. The ISP may, alternatively, implement metering for all of the three or more (or any other suitable number of) traffic classes, but implement dual queuing such that only one traffic class is diverted to the low latency queue, or two traffic classes are diverted to the low latency queue.

In some embodiments, the ISP may also apply dual-queuing policies temporally. For example, application provider-marked L4S-capable traffic could be sent to the low latency queue (e.g., 206, 210 of FIG. 2) only if there is currently no customer-preferred L4S-capable traffic, or if the instantaneous throughput of the customer-preferred L4S-capable traffic is below a threshold.

In some embodiments, the data cap may be a preferential data cap (e.g., to which any L4S-capable traffic counted against, or to which only customer-preferred traffic is counted against or to which only application provider-marked traffic is counted against. In some embodiments, multiple data caps may be used at the same time, and different actions may be performed based on whether one or more of such data caps are reached or exceeded. For example, a combined byteCount of all L4S traffic, e.g., application provider-marked traffic and customer-preferred traffic, may be compared to a first data cap, application-provider-marked traffic may be compared to a second data cap, and customer-preferred traffic may be compared to a third data cap. As an example, if the first data cap is exceeded, certain actions (e.g., shown at 514 or 516) may be performed with respect to both application-provider-marked traffic and customer-preferred traffic; if the second data cap is exceeded, certain actions (e.g., shown at 514 or 516) may be performed with respect to application-provider-marked traffic only; and if the third data cap is exceeded, certain actions (e.g., shown at 514 or 516) may be performed with respect to customer-preferred traffic only.

Figure 7:
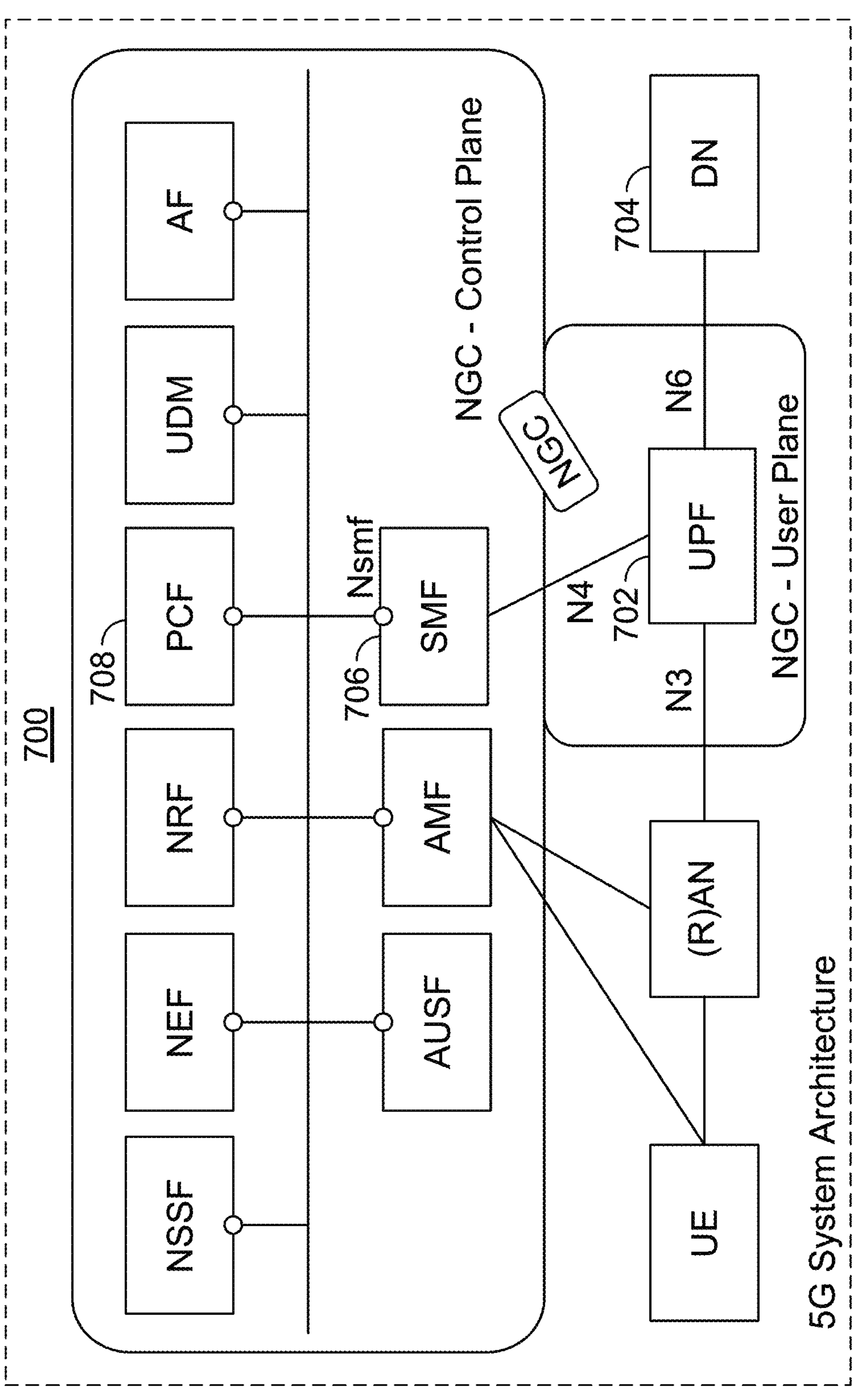
FIG. 7 shows a block diagram for an illustrative architecture of a 5G mobile network, in accordance with some embodiments of this disclosure.

FIG. 7 shows a block diagram 700 for an illustrative architecture of a 5G mobile network, in accordance with some embodiments of this disclosure. In some embodiments, system 100 may implement or otherwise be in communication with such a 5G network. As shown in FIG. 7, for 5G mobile networks, user plane function (UPF) 702 provides an interconnect point between the mobile infrastructure and the Data Network (DN) 704, e.g., encapsulation and decapsulation of general packet radio service (GPRS) tunnelling protocol for the user plane (GTPU). The UPF further provides a protocol data unit (PDU) session anchor point, which provides mobility within and between radio access technologies (RATs), including sending one or more end marker packets to the gNodeB (gNB). The UPF further provides for packet routing and forwarding, including performing the role of an uplink classifier/UL-CL (directing flows to specific data networks based on traffic matching filters) and a branching point, when acting as an intermediate UPF (I-UPF) multi-homed to more than one PDU session anchor (PSA). The UPF further provides application detection using service data flow (SDF) traffic filter templates or 3-tuple (protocol, server-side IP address and port number) packet flow description (PFD) received from session management function (SMF) 706. The UPF further provides per-flow QoS handling, including transport level packet marking for uplink (UL) and downlink (DL), rate limiting and reflective QOS differentiated services codepoint (DSCP) marking on the DL. The 5G SMF 706 is a critical 5G core component that performs a fundamental role in the 5G Service-Based Architecture (SBA). The SMF is primarily responsible for interacting with the decoupled data plane; creating, updating and removing Protocol Data Unit (PDU) sessions; and managing session context with the UPF.

In some embodiments, the techniques described herein for enforcing data caps for preferential traffic may be enforced at an ingest point of a 5G network, which is the 5G UPF, part of the 5G core's SMF leveraging the N4 interface, as shown in FIG. 7. The SMF interfaces, along with the policy control function (PCF) 708, as part of the mobile core, which may be leveraged to provide the L4S management and enforcement. The PCF's functions may include providing policy rules for control plane functions (e.g., network slicing, roaming, and mobility management); accessing subscription information for policy decisions made by a unified data repository (UDR); activating policy and charging control (PCC) rules for a PDU session in the SMF; and/or providing transparency and control over the consumption of network resources during real-time service delivery. In some embodiments, one or more of the policy control function or the user plane function may be used to set or monitor data cap(s).

Figure 8:
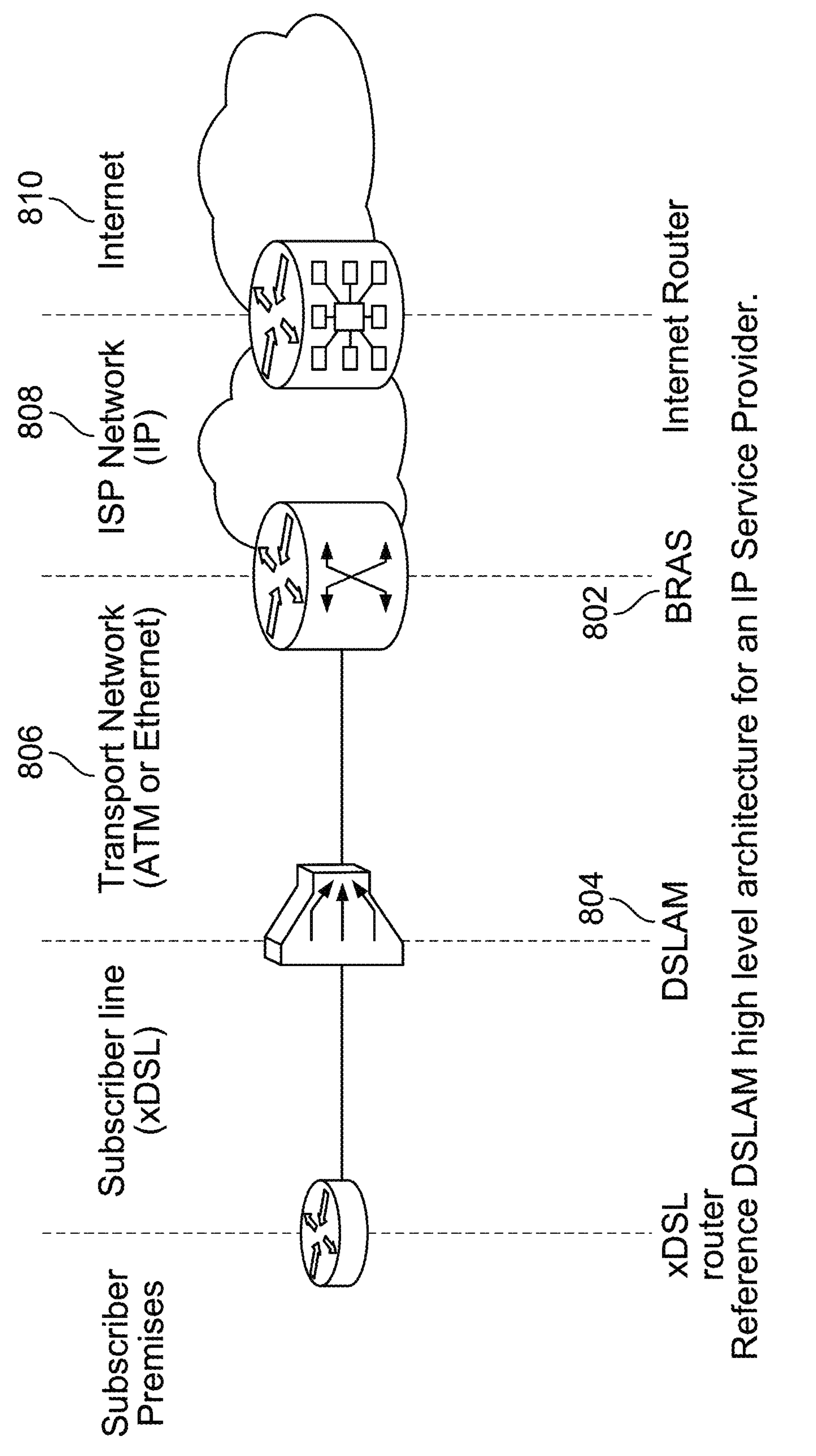
FIG. 8 shows a block diagram for an illustrative architecture of a digital subscriber line access multiplexer (DSLAM) for an IP service provider, in accordance with some embodiments of this disclosure.

FIG. 8 shows a block diagram 800 for an illustrative architecture of a DSLAM for an IP service provider, e.g., an ISP, in accordance with some embodiments of this disclosure. For digital subscriber line (DSL) networks, broadband remote access server (BRAS) 802 is the ingest point into the ISP's IP network 808 from the Internet 810. BRAS 802 may be configured to enforce QoS policies; provide layer 3 connectivity and route IP traffic through an ISP's backbone network to the Internet; aggregate circuits from one or more link access devices, such as, for example, DSLAMs 804; and/or provide layer 2 connectivity through transparent bridging and/or or permanent point-to-point protocol (PPP) sessions over Ethernet or asynchronous transfer mode (ATM) sessions, as shown at 806. In some embodiments, BRAS 802 may be used to implement the methods described herein for assigning ECN markings to bits of headers of packets of network traffic.

FIGS. 9A-9E are illustrative block diagrams and flowcharts for transmitting data based on L4S markings in data packets, in accordance with some embodiments of this disclosure. System 900 comprises real-time transport protocol (RTP) delivery system 902, RTP client 904, TCP delivery system 908, TCP client 914, Internet 910, and operator's network 912. System 900 is an example of handling L4S markings for a TCP and/or UDP sender, where the sender is an application service outside of an operator's network 912 and/or the sender is inside the operator's network 912. RTP delivery system 902 comprises RTP sender 918 and UDP socket address 920, and RTP client 904 comprises UDP socket 922 and transmission receiver 924. TCP delivery system 908 comprises TCP sender 926 and TCP socket 928. TCP client 914 comprises TCP socket 930 and transmission receiver 932.

Figure 9A:
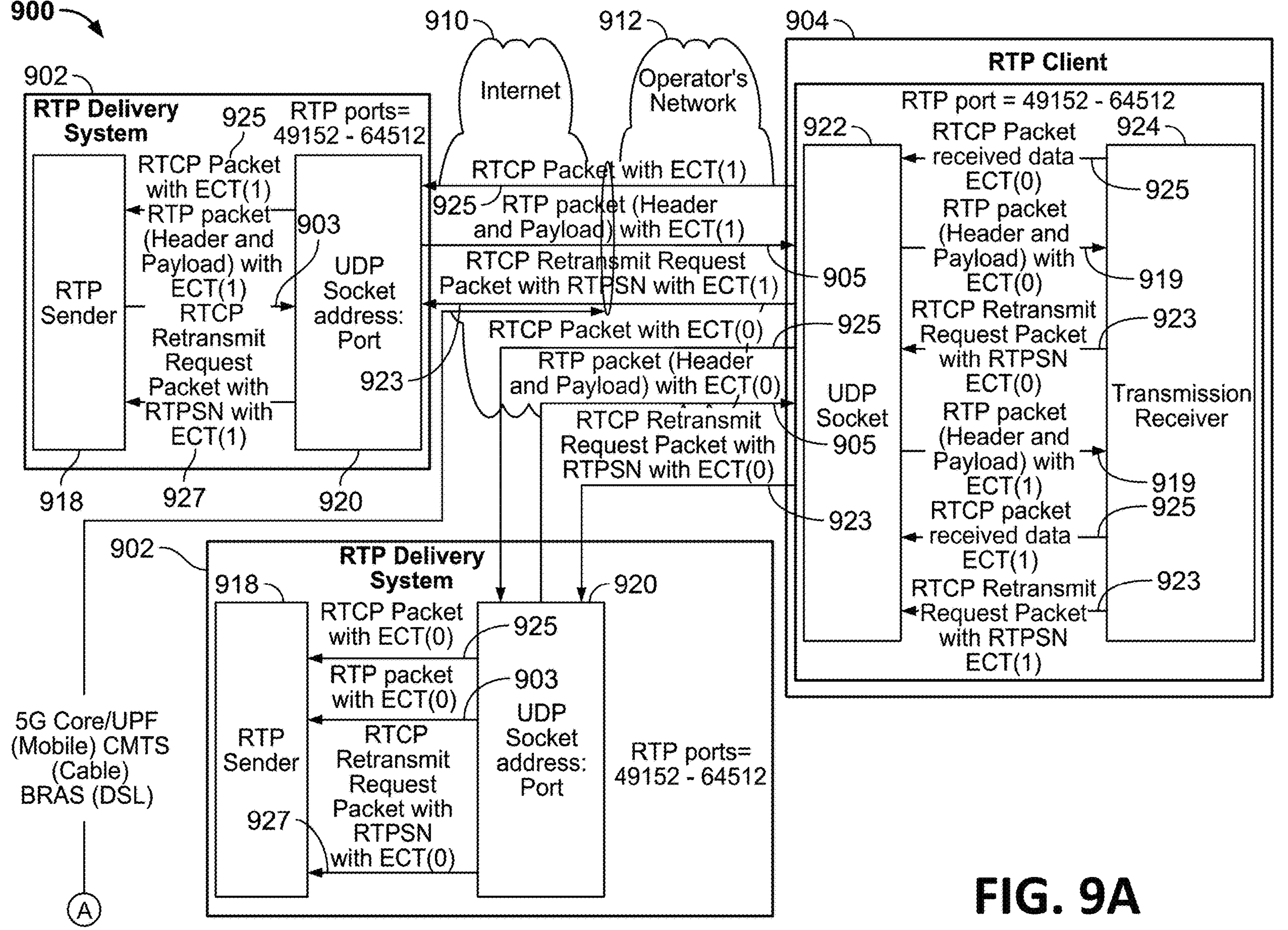
FIGS. 9A-9E are illustrative block diagrams and flowcharts for transmitting data based on L4S markings in data packets, in accordance with some embodiments of this disclosure.
Figure 9A:
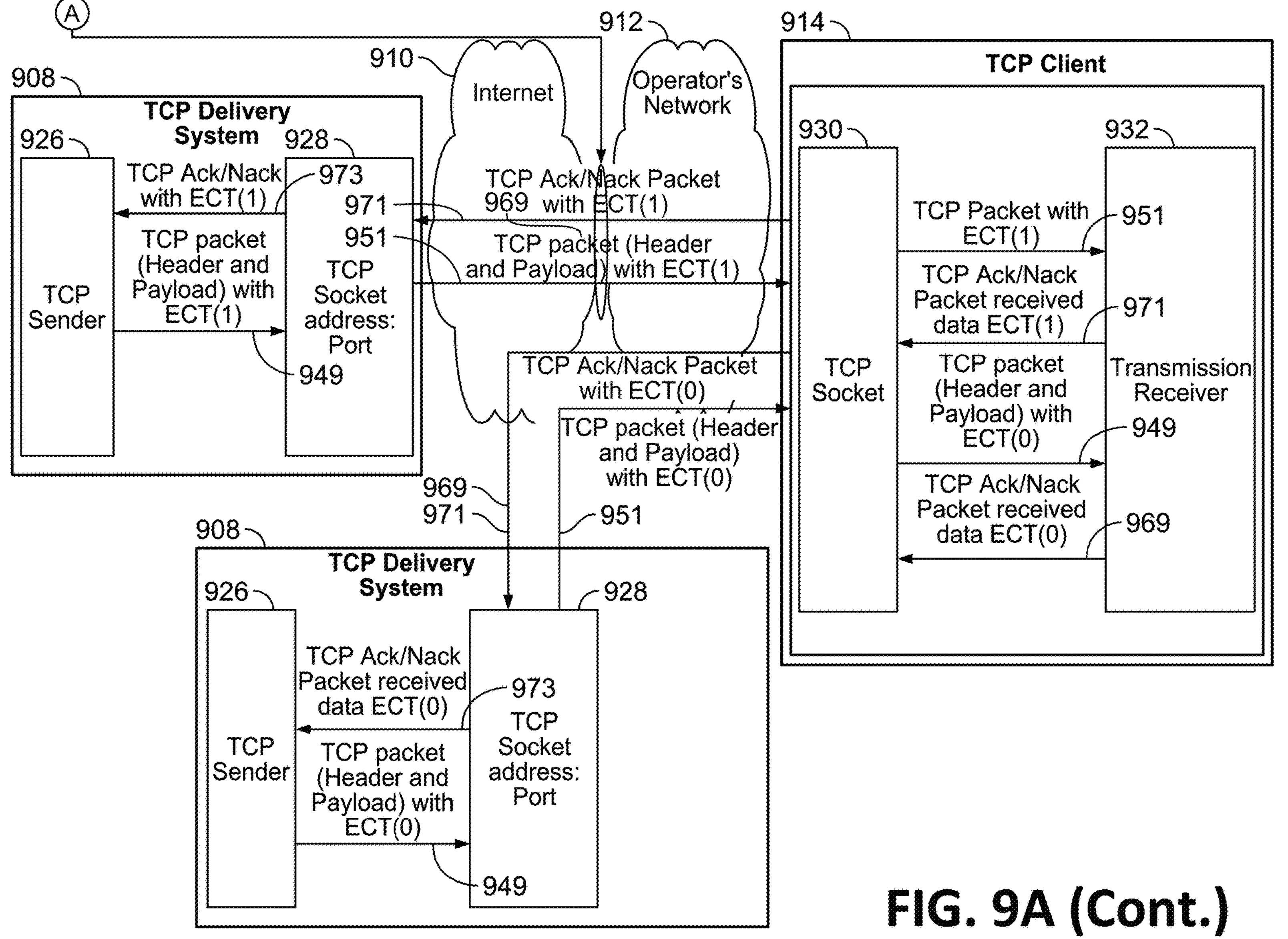
Figure 9B:
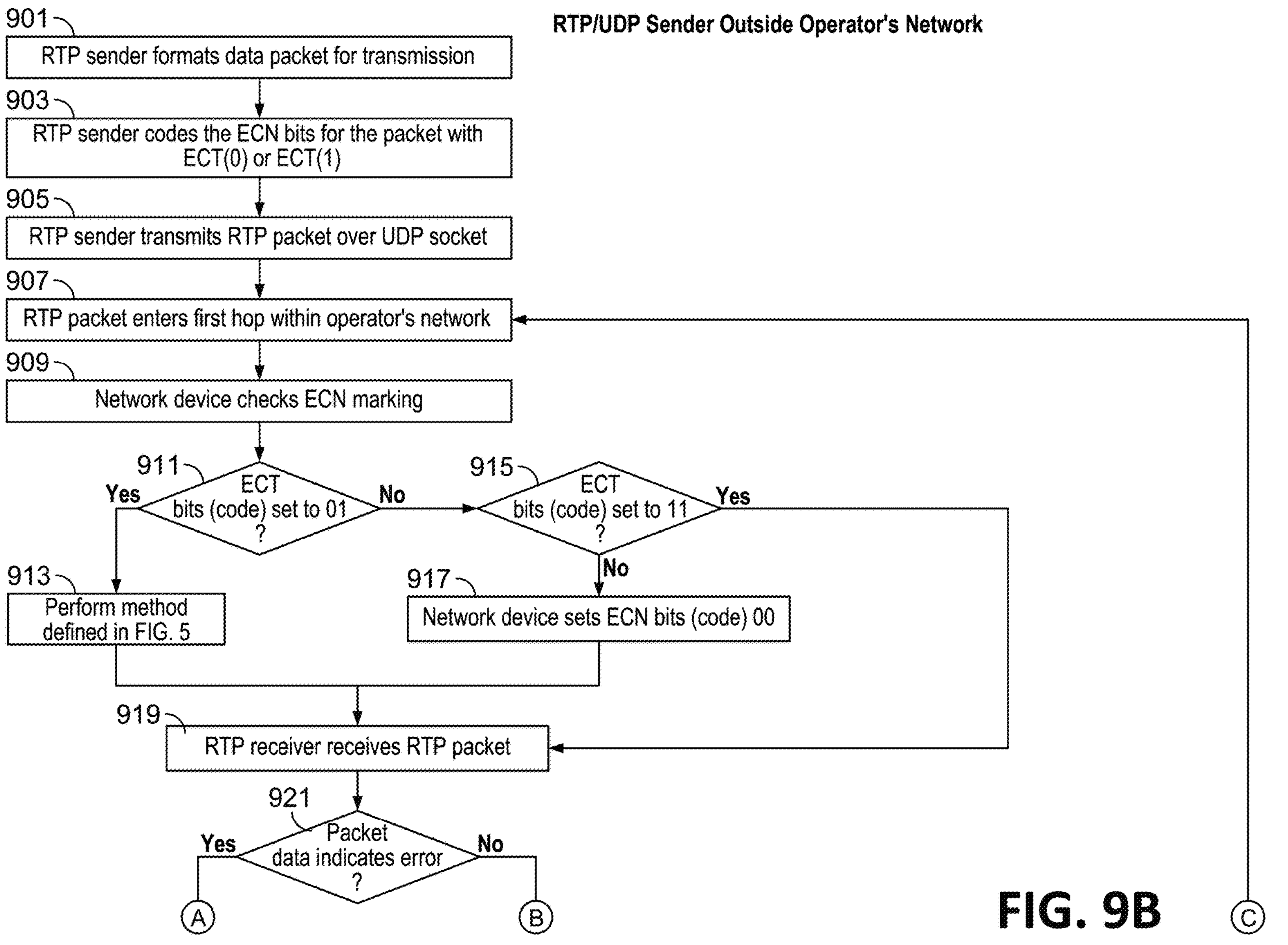
Figure 9B:
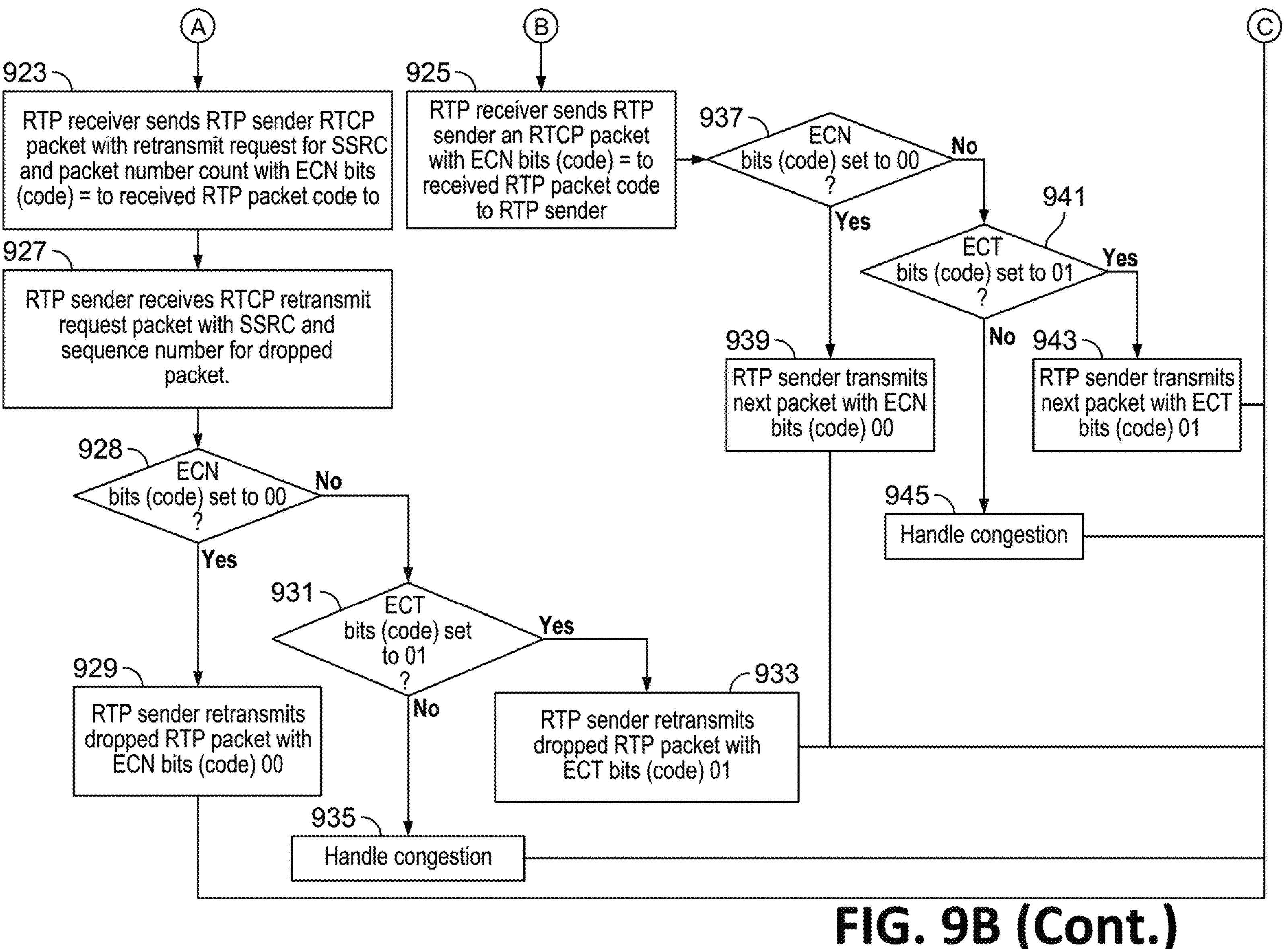

As shown in FIGS. 9A-9B, the techniques described herein may be performed in relation to data transmitted by or received at an RTP/UDP sender (e.g., an application service provider) outside an operator's network. At 901, RTP sender 918 of RTP delivery system 902 formats a data packet for transmission, and at 903, RTP sender 918 codes the ECN bits for the packet with ECT(0) or ECT(1), e.g., indicative of either ISP-marked L4S-capable network traffic or application service provider-marked L4S-capable network traffic. At 905, RTP sender 918 transmits the packet of 903 as an RTP packet over UDP socket 920, and at 907, the RTP packet enters a first hop within operator's network 912. At 909, a network device (e.g., networking equipment 122 of FIG. 1 or modem 106 and/or router 108 of FIG. 1) receives and checks the RTP packet for an ECN marking. At 911, the network device determines whether the ECT bits are set to 01, e.g., indicating that the packet is L4S-capable. If so, processing may proceed to 913; otherwise processing may proceed to 915. At 913, the method as defined in FIG. 5 may be performed. At 915, the network device determines whether the ECT bits are set to 11, e.g., indicating that congestion is being experienced. If so, processing may proceed to 919, where RTP receiver (e.g., RTP client 904) receives the RTP packet. Otherwise, at 917, the network device sets the ECN bits to 00, e.g., marking the packet as belonging to a regular, non-L4S-capable flow prior to proceeding to 919.

At 921, RTP receiver 912 determines whether the packet data indicates an error; if so, processing proceeds to 923; otherwise processing proceeds to 925. At 923, RTP client 904 sends RTP sender 918 an RTCP packet with a retransmit request for synchronization source (SSRC) and packet number count with ECN bits equal to a received RTP packet code. At 925, RTP client 904 sends RTP sender 918 an RTCP packet with ECN bits that is equal to a received RTP packet code. After 923, at 927, RTP sender 918 receives the RTCP retransmit request pack with SSRC and a sequence number of a dropped packet, and at 928, determines whether the ECN bits are set to 00 (e.g., non-ECN-capable transport). If so, at 929, RTP sender 918 retransmits the dropped RPT packet with ECN bits 00. Otherwise, at 931, RTP sender 918 determines whether the ECN bits are set to 01 (e.g., indicative of L4S-capable transport); if so, processing proceeds to 933; otherwise, RTP delivery system 902 handles the congestion at 935, e.g., using the L4S's dual queue and ECN mechanism. At 933, RTP delivery system 902 retransmits the dropped RTP packet with ECT bits 01.

After 925, at 937, RTP sender 918 determines whether the ECN bits are set to 00. If so, processing proceeds to 939; otherwise processing proceeds to 941. At 939, RTP sender 918 transmits a next packet with ECN bits 00, e.g., indicative of non-ECN-capable transport. At 943, having determined at 941 that the ECN bits are set to 01, RTP sender 918 transmits a next packet with ECT bits 01, e.g., indicative of L4S-capable transport. At 945, having determined at 941 that the ECN bits are not set to 01, RTP delivery system 902 handles the congestion, e.g., using the L4S's dual queue and ECN mechanism.

Figure 9C:
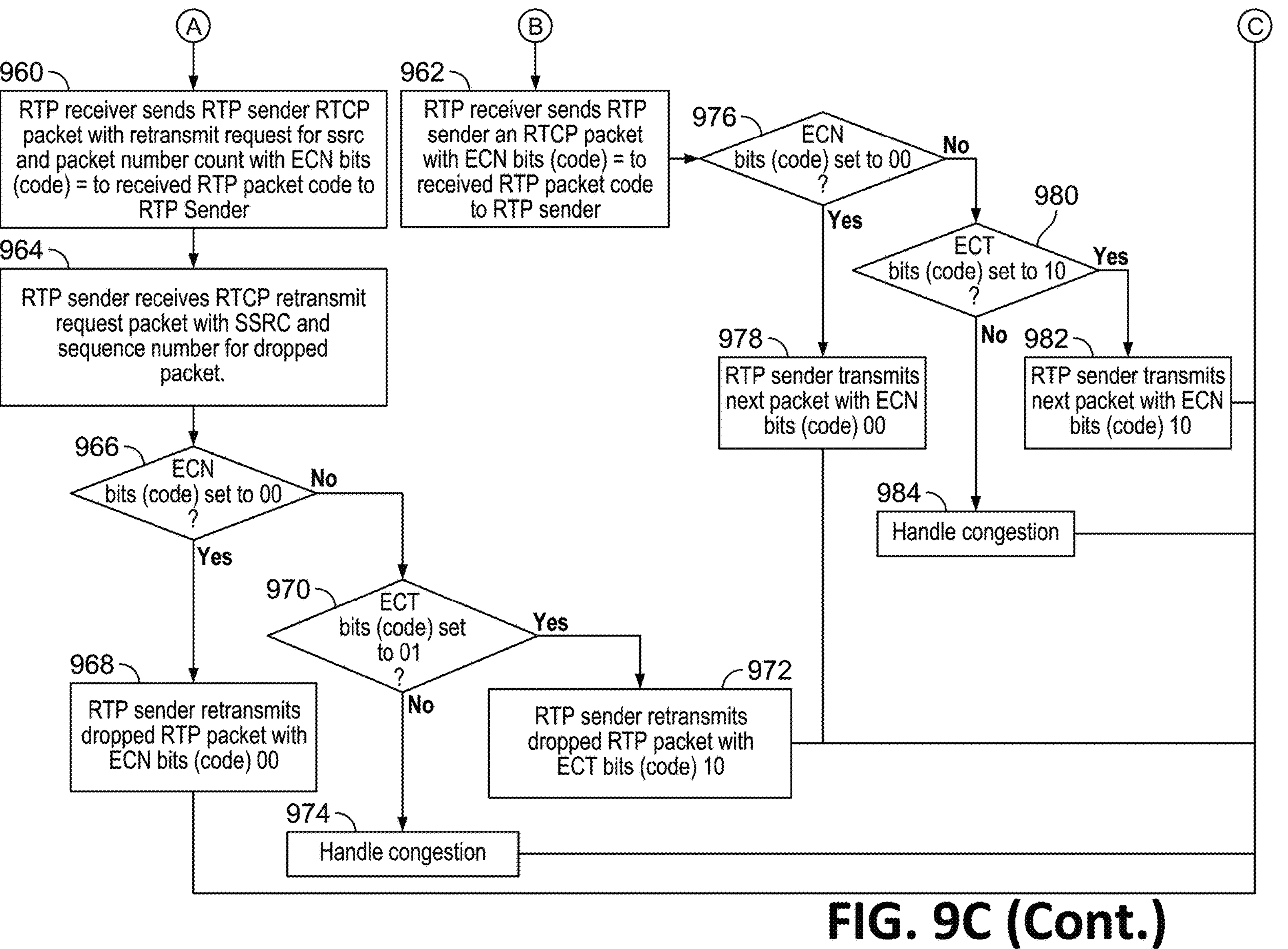

As shown in FIGS. 9A and 9C, the techniques described herein may be performed in relation to data transmitted by or received at an RTP/UDP sender (e.g., an application service provider) inside an operator's network. As shown in FIG. 9C, steps 940, 942, and 944 may be performed in the same or similar manner as 901, 903, and 905, respectively, of FIG. 9B. At 946, a network device (e.g., router 108 of FIG. 1) check whether an ECN marking, a source IP address, and a destination IP address to determine if the packet originated inside an operator's network. At 948, the network device may determine whether the ECN bits are set to 10. If so, processing may proceed to 950, where the method defined in FIG. 6 may be performed. Otherwise, processing may proceed to 952. Steps 952, 954, 956, 958, 960, 962, 964, 966, and 968, of FIG. 9C may be performed in a similar manner as in steps 915, 917, 919, 921, 923, 925, 927, 928, and 929, respectively. At 970, RTP sender 918 determines whether the ECN bits are set to 10 (e.g., indicative of ECN-capable transport); if so, processing proceeds to 972; otherwise, RTP delivery system 902 handles the congestion at 974, e.g., using the L4S's dual queue and ECN mechanism. At 972, RTP delivery system 902 retransmits the dropped RTP packet with ECT bits 10. Steps 976 and 978 may be performed in a similar manner as 937 and 939 of FIG. 9B.

After 962, at 976, RTP sender 918 determines whether the ECN bits are set to 00. If so, processing proceeds to 978; otherwise processing proceeds to 980. At 978, RTP sender 918 transmits a next packet with ECN bits 00, e.g., indicative of non ECN-capable transport. At 982, having determined at 980 that the ECN bits are set to 10, RTP sender 918 transmits a next packet with ECT bits 10, e.g., indicative of L4S-capable transport. At 984, having determined at 980 that the ECN bits are not set to 10, RTP delivery system 902 handles the congestion, e.g., using the L4S's dual queue and ECN mechanism.

Figure 9D:
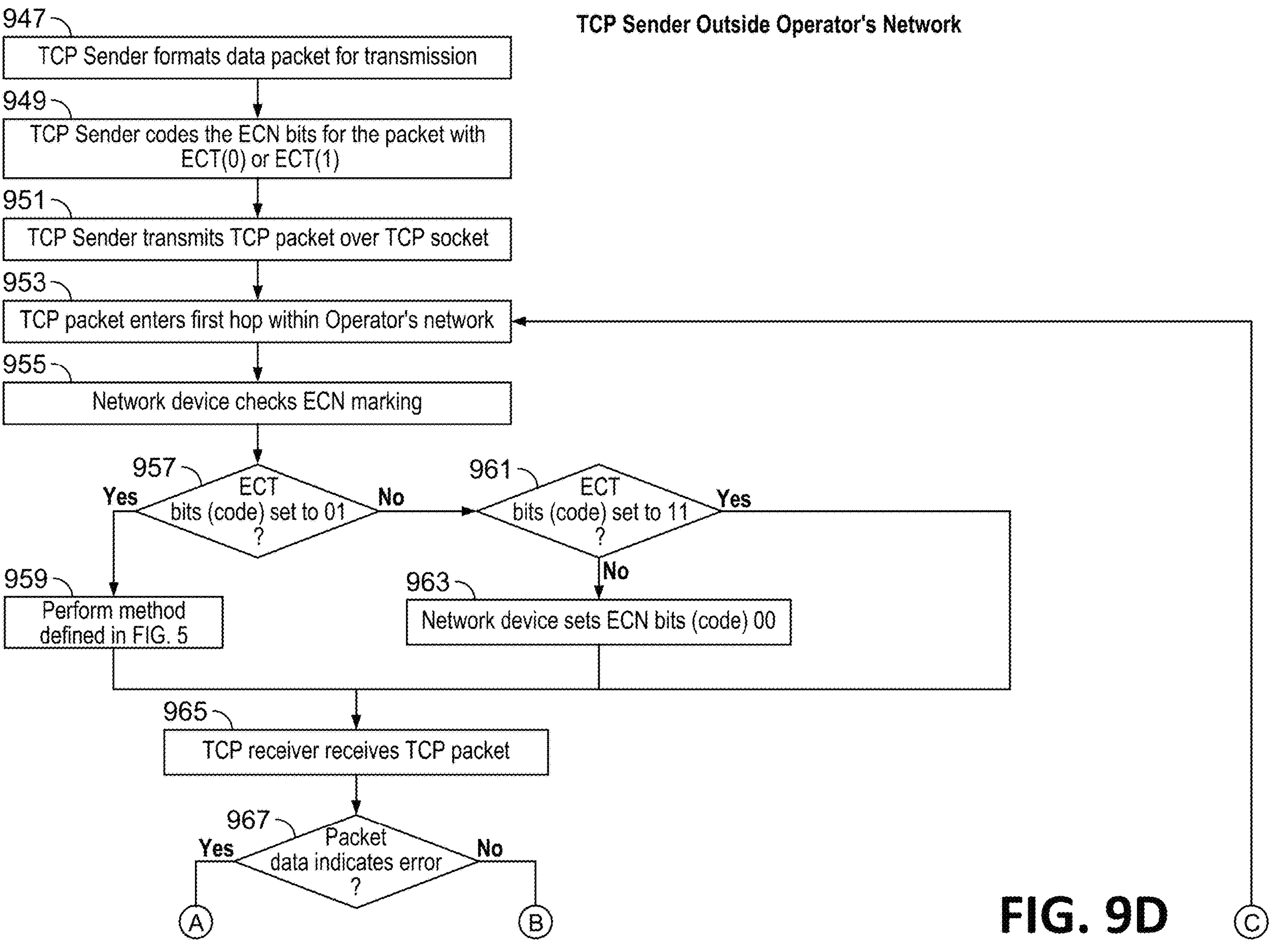
Figure 9D:
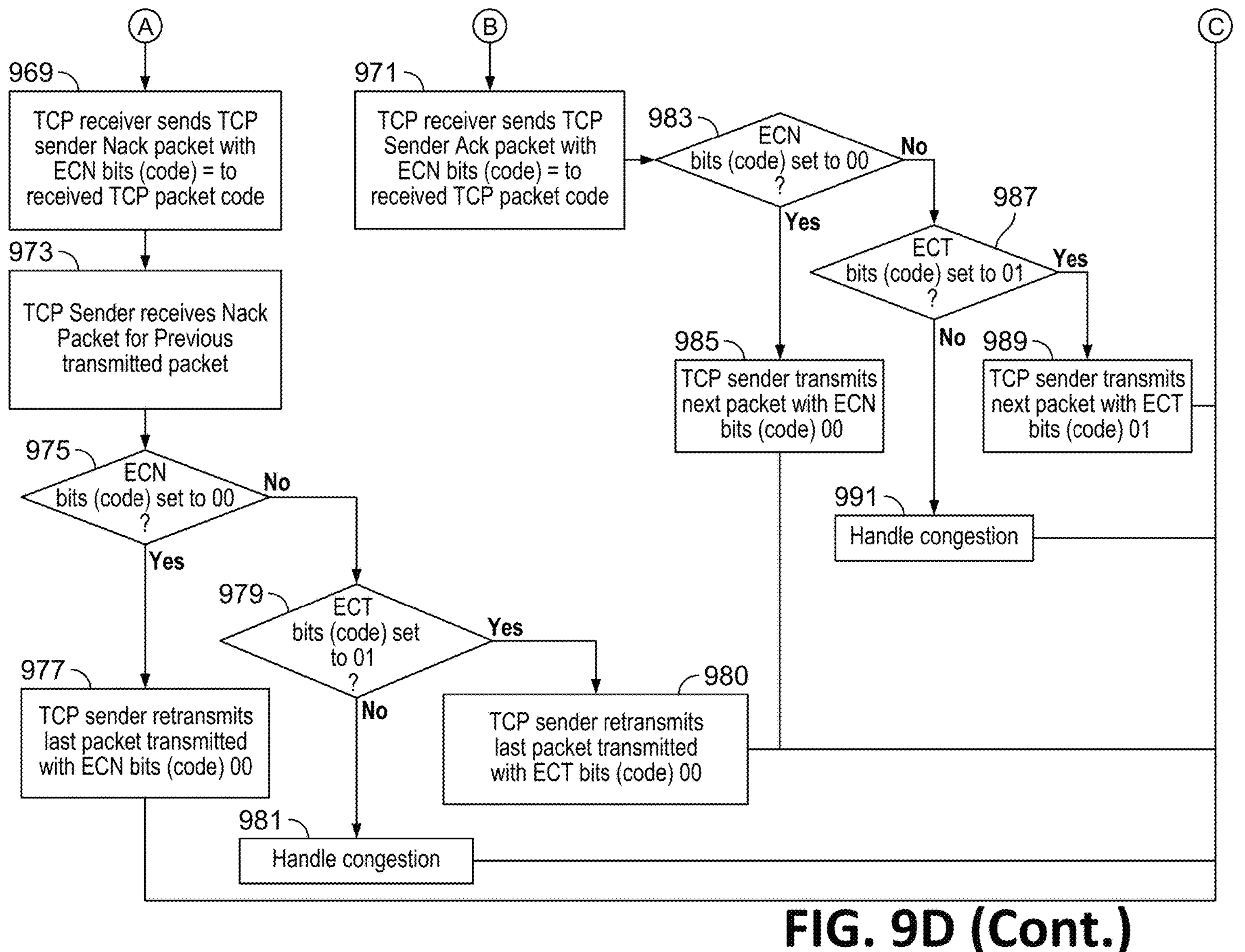

As shown in FIGS. 9A and 9D, the techniques described herein may be performed in relation to data transmitted by or received at a TCP sender (e.g., an application service provider) outside an operator's network. At 947, TCP sender 926 of TCP delivery system 908 formats a data packet for transmission, and at 949, TCP sender 926 codes the ECN bits for the packet with ECT(0) or ECT(1), e.g., indicative of either ISP-marked L4S-capable network traffic or application service provider-marked L4S-capable network traffic. At 951, TCP sender 926 transmits the packet of 949 as an TCP packet over TCP socket 928, and at 953, the TCP packet enters a first hop within operator's network 912. At 955, a network device (e.g., networking equipment 122 of FIG. 1 or router 108 or cable modem 106 of FIG. 1) receives and checks the TCP packet for an ECN marking. At 957, the network device determines whether the ECT bits are set to 01, e.g., indicating that the packet is L4S-capable. If so, processing may proceed to 959; otherwise processing may proceed to 961. At 959, the method as defined in FIG. 5 may be performed. At 961, network device determines whether the ECT bits are set to 11, e.g., indicating that congestion is being experienced. If so, processing may proceed to 965, where TCP receiver (e.g., TCP client 914) receives the TCP packet. Otherwise, at 963, the network device sets the ECN bits to 00, e.g., marking the packet as belonging to a regular, non-L4S-capable flow prior to proceeding to 965.

At 967, TCP receiver 914 determines whether the packet data indicates an error; if so, processing proceeds to 969; otherwise processing proceeds to 971. At 969, TCP receiver or client 914 sends TCP sender 926 a NACK packet with ECN bits equal to a received TCP packet code At 971, TCP client 914 sends TCP sender 926 an ACK packet with ECN bits equal to the received packet code. At 973, TCP sender 926 receives NACK packet for the previously transmitted packet.

At 975, TCP delivery system 908 determines whether the ECN bits are set to 00 (e.g., non-ECN-capable transport). If so, at 977, TCP sender 926 retransmits the last transmit TCP packet with ECN bits 00. Otherwise, at 979, TCP sender 926 determines whether the ECN bits are set to 01 (e.g., indicative of L4S-capable transport); if so, processing proceeds to 980; otherwise, TCP delivery system 908 handles the congestion at 981, e.g., using the L4S's dual queue and ECN mechanism. At 980, TCP sender 926 retransmits the last transmit TCP packet with ECN bits 00.

After 971, at 983, upon determining that ECN bits are set to 00, processing proceeds to 985. Otherwise, processing proceeds to 987. At 985, TCP sender 926 transmits a next packet with ECN bits 00, e.g., indicative of non-ECN-capable transport. At 989, having determined at 987 that the ECN bits are set to 01, TCP sender 926 transmits a next packet with ECT bits 01, e.g., indicative of L4S-capable transport. At 991, having determined at 987 that the ECN bits are not set to 01, TCP delivery system 908 handles the congestion, e.g., using the L4S's dual queue and ECN mechanism.

Figure 9E:
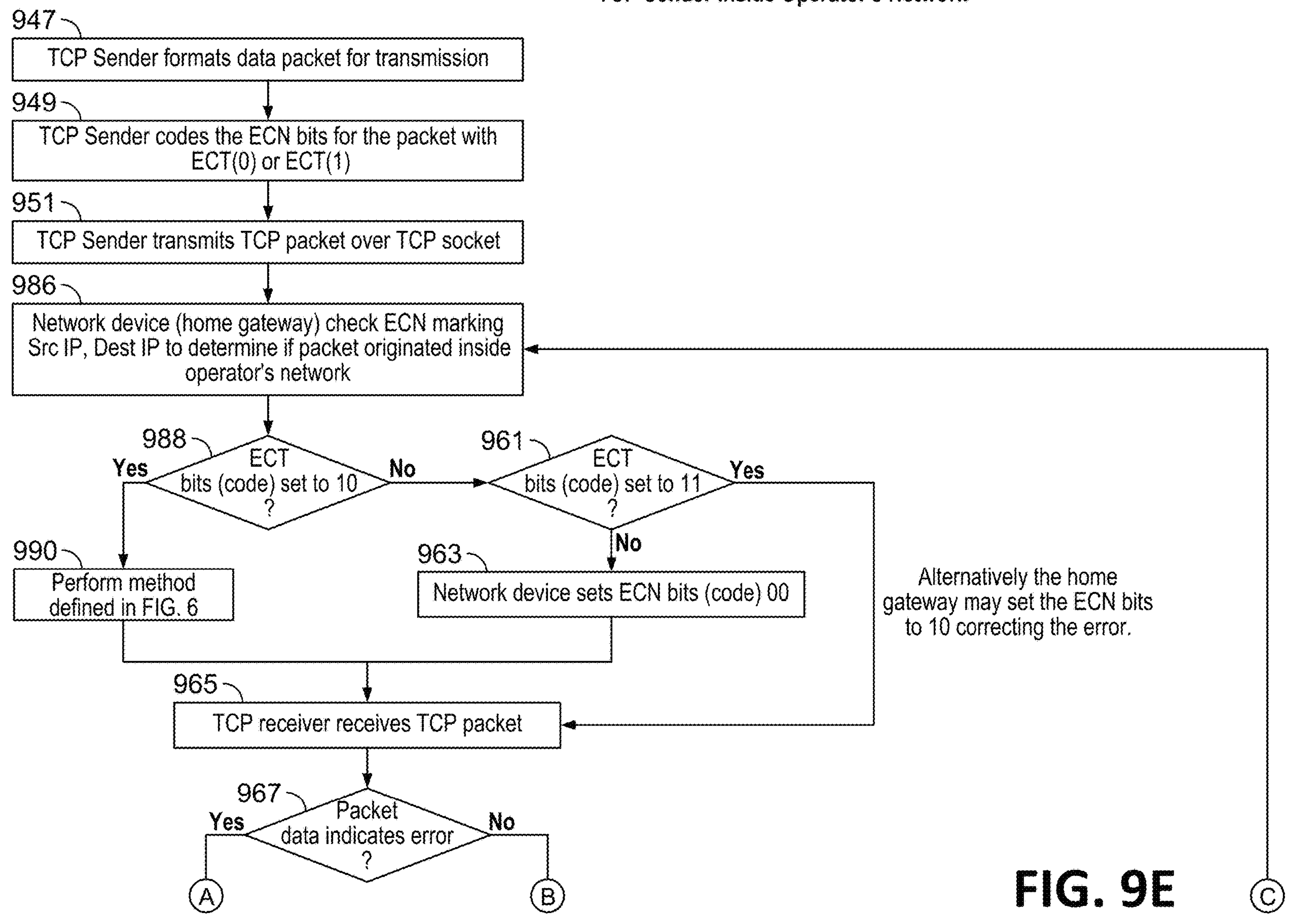
Figure 9E:
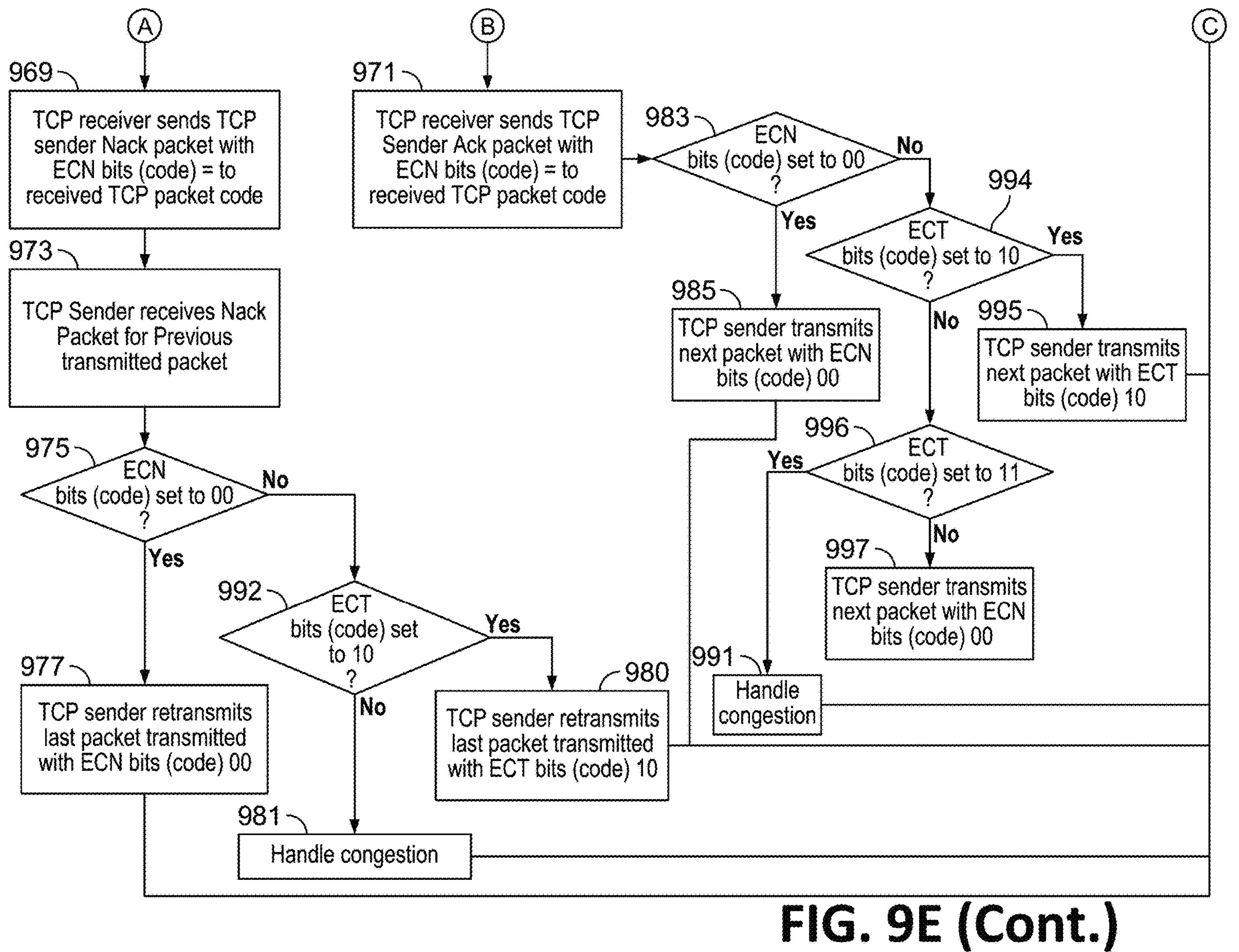

As shown in FIGS. 9A and 9E, the techniques described herein may be performed in relation to data transmitted by or received at a TCP sender (e.g., an application service provider) outside an operator's network. As shown in FIG. 9E, steps 947, 949, and 951 may be performed as in FIG. 9D. At 986, a network device (e.g., router 108 and/or modem 106 of FIG. 1) may check the TCP packet for an ECN marking, a source IP address, and a destination IP address to determine whether such packet originated inside the operator's network. If so, processing may proceed to 988, where the network device may determine whether the ECT bits are set to 10. If so, processing may proceed to 990, where the method shown in FIG. 6 may be performed. A negative determination at 988 causes processing to proceed to 961. Steps 961, 963, 965, 967, 969, 971, 973, 975, and 977 may be performed in a similar manner as in FIG. 9D. At 992, upon determining that ECT bits are set to 10 in the packet, processing may proceed to 980; otherwise processing may proceed to 981. Steps 980, 981, 983, and 985 may be performed in a similar manner as in FIG. 9E. At 994, upon determining that the ECT bits are set to 10, e.g., indicating that the packet has an attribute of being an ECN-capable transport, processing may proceed to 995, where TCP sender 926 transmits a next packet with ECT bits 10, e.g., to TCP client 914; otherwise, a negative determination at 994 causes processing to proceed to 996. At 996, upon determining that the ECT bits are set to 11, e.g., indicating congestion experienced, TCP delivery system 908 handles the congestion, e.g., using the L4S's dual queue and ECN mechanism. Otherwise, at 887, upon determining that the ECT bits are set to 11, TCP delivery system 908 transmits a next packet with ECN bits sent to 00.

L4S is a relatively new standard. Network equipment manufacturers such as commercial router companies, DOCSIS companies, and mobile equipment companies have started supporting L4S in their equipment. Consumer electronics companies are also starting to provide support in consumer grade routers, and operating systems and other software are starting to offer L4S support through APIs. However, some equipment along the path between the sender and receiver, and/or the receiver, may not provide L4S support. As an example, a TCP or UDP packet may be marked by an application service provider's sender and transmitted to the client device. For example, if the L4S ECN bits are dropped or the marking is lost, the receiver's TCP ACK or NACK response is not L4S marked. The same is true for RTP or real-time control transport protocol (RTCP) packets. For example, if an RTP packet is marked as L4S and transmitted over the network and that marking is lost, the L4S ECN marking is not included in the RTCP response. Today, the sender will continue marking the L4S packets to be sent to that receiver. If an RTP packet is sent from a sender to a receiver and the ECN L4S marking is lost, the RTCP response packet from the sender will not be L4S-ECN marked.

For example, if the packet sender receives a response packet that is not ECN marked, this indicates that, at any hop along the route to the client, at least one network equipment the packet traversed did not support the ECN markings, and/or indicates that the client device does not support ECN. As soon as a sender receives a response with no ECN marking, the sender may disable the ECN marking for any future packets. This reduces the possibility of network congestion for L4S traffic flows, and provides an elegant solution for a graceful way of the sender handling the network operator's remarking of L4S-transmitted packets due to the data cap enforcement.

Figure 10:
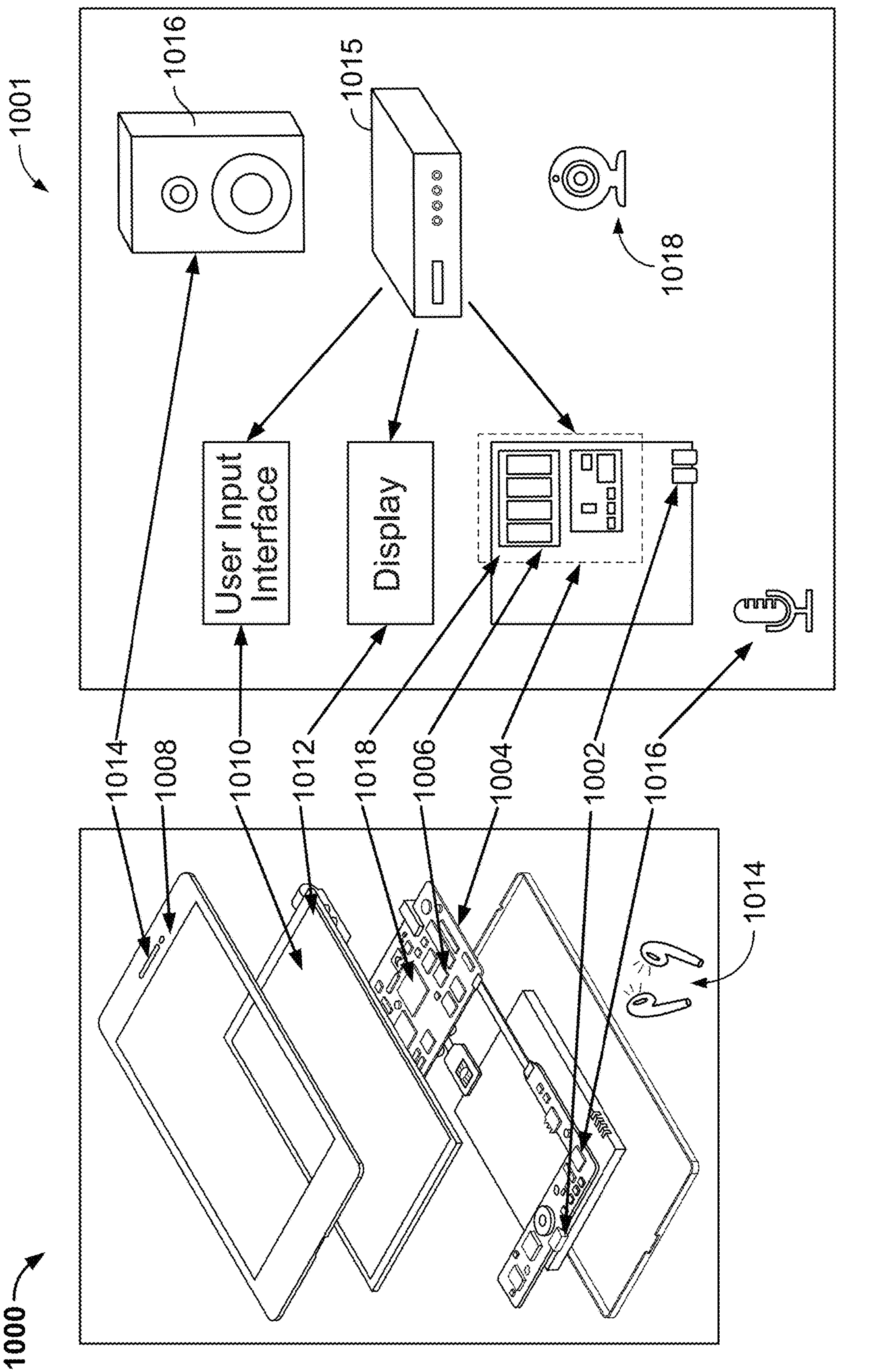
FIGS. 10-11 show illustrative devices and systems for enforcing a data cap for preferential network traffic, in accordance with some embodiments of this disclosure.
Figure 11:
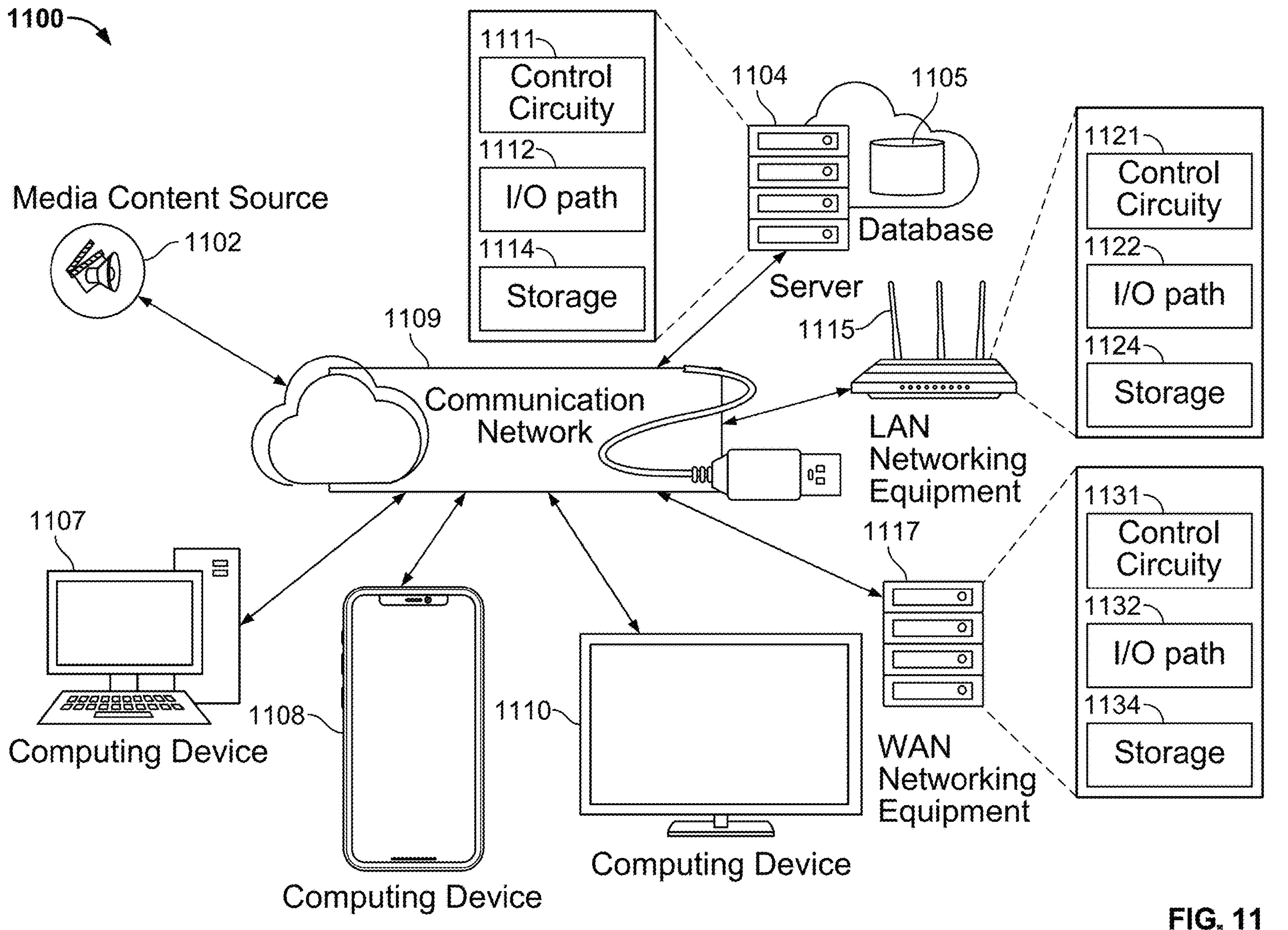

FIGS. 10-11 show illustrative devices, systems, servers, and related hardware for enforcing a data cap for preferential network traffic, in accordance with some embodiments of this disclosure. FIG. 10 shows generalized embodiments of illustrative computing devices 1000 and 1001, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR HMD; a VR HMD; or any other suitable computing device; or any combination thereof. In another example, computing device 1001 may be a user television equipment system or device. In some embodiments, computing devices 1000 and 1001 may correspond to, e.g., device 112 or device 114 of FIG. 1.

User television equipment device 1001 may include set-top box 1015. Set-top box 1015 may be communicatively connected to microphone 1016, Audio output equipment (e.g., speaker or headphones 1014), and display 1012. In some embodiments, microphone 1016 may receive audio corresponding to a voice of a user providing input. In some embodiments, display 1012 may be a television display or a computer display. In some embodiments, set-top box 1015 may be communicatively connected to user input interface

1010. In some embodiments, user input interface 1010 may be a remote control device. Set-top box 1015 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 11. In some embodiments, computing device 1000 may comprise any suitable number of sensors (e.g., gyroscope or accelerometer, etc.), and/or a GPS module (e.g., in communication with one or more servers and/or cell towers and/or satellites) to ascertain a location of computing device 1000. In some embodiments, computing device 1000 comprises a rechargeable battery that is configured to provide power to the components of the device.

Figure 3:
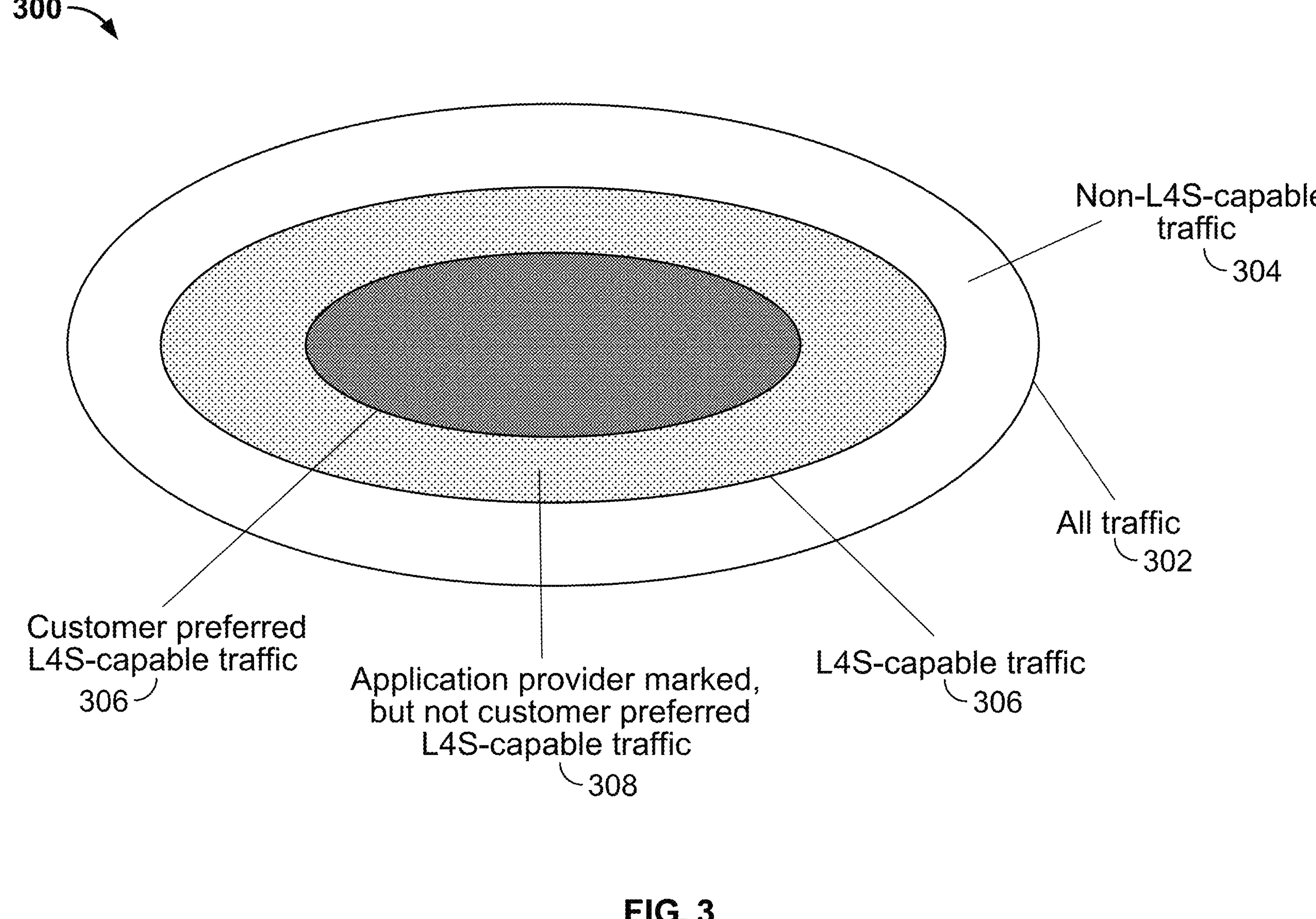
FIG. 3 shows an illustrative diagram of network traffic in a system, in accordance with some embodiments of this disclosure.

Each one of computing device 1000 and computing device 1001 may receive content and data via input/output (I/O) path 1002. I/O path 1002 may provide content (e.g., broadcast programming, on-demand programming, Internet content, content available over a local area network (LAN) or wide area network (WAN), and/or other content) and data to control circuitry 1004, which may comprise processing circuitry 1006 and storage 1008. Control circuitry 1004 may be used to send and receive commands, requests, and other suitable data using I/O path 1002, which may comprise I/O circuitry. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing. While set-top box 1015 is shown in FIG. 3 for illustration, any suitable computing device having processing circuitry, control circuitry, and storage may be used in accordance with the present disclosure. For example, set-top box 1015 may be replaced by, or complemented by, a personal computer (e.g., a notebook, a laptop, a desktop), a smartphone (e.g., computing device 1000), an XR device; a tablet; a network-based server hosting a user-accessible client device; a non-user-owned device; any other suitable device; or any combination thereof.

Control circuitry 1004 may be based on any suitable control circuitry such as processing circuitry 1006. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for the system (e.g., system 100 of FIG. 1) or application stored in memory (e.g., storage 1008). Specifically, control circuitry 1004 may be instructed by the system or application to perform the functions discussed above and below. In some implementations, processing or actions performed by control circuitry 1004 may be based on instructions received from the system or application.

In client/server-based embodiments, control circuitry 1004 may include communications circuitry suitable for communicating with a server or other networks or servers. The system or application may be a stand-alone application implemented on a device or a server. The system or application may be implemented as software or a set of executable instructions. The instructions for performing any of the embodiments discussed herein of the system or application may be encoded on non-transitory computer-readable media (e.g., a hard drive, random-access memory on a DRAM integrated circuit, read-only memory on a BLU-RAY disk, etc.). For example, the instructions may be stored in storage 1008, and executed by control circuitry 1004 of a computing device 1000.

In some embodiments, the system or application may be a client/server application where only the client application resides on device 1000 (e.g., device 112 or 114), and a server application resides on an external server (e.g., server 1104). For example, the system or application may be implemented partially as a client application on control circuitry 1004 of device 1000 and partially on server 1104 as a server application running on control circuitry 1111. Server 1104 may be a part of a local area network with one or more of computing devices 1000, 1001 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 1104 and/or an edge computing device), referred to as "the cloud." Device 1000 may be a cloud client that relies on the cloud computing capabilities from server 1104 to determine whether processing (e.g., at least a portion of virtual background processing and/or at least a portion of other processing tasks) should be offloaded from the mobile device, and facilitate such offloading. When executed by control circuitry of server 1104, the system or application may instruct control circuitry 1111 to perform processing tasks for the client device and facilitate enforcement of data cap and/or metering. The client application may instruct control circuitry 1004 to determine whether processing should be offloaded. In some embodiments, data structure 700, 702, 704 of FIGS. 7A-7C may be located at server 1104 and/or database 1105 and/or at computing device 1107, 1108 and/or 1110.

Control circuitry 1004 may include communications circuitry suitable for communicating with a server, edge computing systems and devices, a table or database server, or other networks or servers The instructions for carrying out the above mentioned functionality may be stored on a server (which is described in more detail in connection with FIG. 11. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 11). In addition, communications circuitry may include circuitry that enables peer-to-peer communication of computing devices, or communication of computing devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as the system or application data described above. Nonvolatile memory may also be used (e.g., to launch a boot-up routine and other instructions). Cloud-based storage, described in more detail in relation to FIG. 11, may be used to supplement storage 1008 or instead of storage 1008.

Control circuitry 1004 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1004 may also include scaler circuitry for upconverting and downconverting content into the preferred output format of computing device 1000. Control circuitry 1004 may also include digital-to-analog converter circuitry and analog-to-digital converter circuitry for converting between digital and analog signals. The tuning and encoding circuitry may be used by computing device 1000, 1001 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from computing device 1000, the tuning and encoding circuitry (including multiple tuners) may be associated with storage 1008.

Control circuitry 1004 may receive instruction from a user by way of user input interface 1010. User input interface 1010 may be any suitable user interface, such as a remote control, mouse, trackball, keypad, keyboard, touchscreen, touchpad, stylus input, joystick, voice recognition interface, or other user input interfaces. Display 1012 may be provided as a stand-alone device or integrated with other elements of each one of computing device 1000 and computing device 1001. For example, display 1012 may be a touchscreen or touch-sensitive display. In such circumstances, user input interface 1010 may be integrated with or combined with display 1012. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 1010 may include a handheld remote-control device having a microphone and control circuitry configured to receive and identify voice commands and transmit information to set-top box 1015.

Audio output equipment 1014 may be integrated with or combined with display 1012. Display 1012 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1012. Audio output equipment 1014 may be provided as integrated with other elements of each one of computing device 1000 and computing device 1001 or may be stand-alone units. An audio component of videos and other content displayed on display 1012 may be played through speakers (or headphones) of audio output equipment 1014. In some embodiments, audio may be distributed to a receiver (not shown), which processes and outputs the audio via speakers of audio output equipment 1014. In some embodiments, for example, control circuitry 1004 is configured to provide audio cues to a user, or other audio feedback to a user, using speakers of audio output equipment 1014. There may be a separate microphone 1016 or audio output equipment 1014 may include a microphone configured to receive audio input such as voice commands or speech. For example, a user may speak letters or words or terms or numbers that are received by the microphone and converted to text by control circuitry 1004. In a further example, a user may voice commands that are received by a microphone and recognized by control circuitry 1004. Camera 1018 may be any suitable video camera integrated with the equipment or externally connected. Camera 1018 may be a digital camera comprising a charge-coupled device (CCD) and/or a complementary metal-oxide semiconductor (CMOS) image sensor. Camera 1018 may be an analog camera that converts to digital images via a video card.

The system or application may be implemented using any suitable architecture. For example, it may be a stand-alone application wholly-implemented on each one of computing device 1000 and computing device 1001. In such an approach, instructions of the application may be stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to provide the functionality, and generate any of the displays, discussed herein. Based on the processed instructions, control circuitry 1004 may determine what action to perform when input is received from user input interface 1010. For example, movement of a cursor on a display up/down may be indicated by the processed instructions when user input interface 1010 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1004 may allow a user to provide user profile information or may automatically compile user profile information. For example, control circuitry 1004 may access and monitor network data, video data, audio data, processing data, historical interactions by the user, and/or any other suitable data. Control circuitry 1004 may obtain all or part of other user profiles that are related to a particular user (e.g., via social media networks), and/or obtain information about the user from other sources that control circuitry 1004 may access. As a result, a user can be provided with a unified experience across the user's different devices.

In some embodiments, the system or application is a client/server-based application. Data for use by a thick or thin client implemented on each one of computing device 1000 and computing device 1001 may be retrieved on-demand by issuing requests to a server remote to each one of computing device 1000 and computing device 1001. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on computing device 1000. This way, the processing of the instructions is performed remotely by the server while the resulting displays (e.g., that may include text, a keyboard, or other visuals) are provided locally on computing device 1000. Computing device 1000 may receive inputs from the user via input interface 310 and transmit those inputs to the remote server for processing and generating the corresponding displays. For example, computing device 1000 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 1000 for presentation to the user.

In some embodiments, the system or application may be downloaded and interpreted or otherwise run by an interpreter or virtual machine (run by control circuitry 1004). In some embodiments, system or application may be encoded in the ETV Binary Interchange Format (EBIF), received by control circuitry 1004 as part of a suitable feed, and interpreted by a user agent running on control circuitry 1004. For example, the system or application may be an EBIF application. In some embodiments, the system or application may be defined by a series of JAVA-based files that are received and run by a local virtual machine or other suitable middleware executed by control circuitry 1004. In some of such embodiments (e.g., those employing MPEG-2, MPEG-4, HEVC or any other suitable digital media encoding schemes), the system or application may be, for example, encoded and transmitted in an MPEG-2 object carousel with the MPEG audio and video packets of a program.

FIG. 11 is a diagram of an illustrative system 1100 for providing recommendations for enforcing a data cap for preferential network traffic, in accordance with some embodiments of this disclosure. Computing devices 1107, 1108, 1110 (which may correspond to, e.g., computing device 1000 or 1001) may be coupled to communication network 1109. Communication network 1109 may be one or more networks including the Internet, a mobile phone network, mobile voice or data network (e.g., a 5G, 4G, or LTE network), cable network, public switched telephone network, satellite network, or other types of communication network or combinations of communication networks. Paths (e.g., depicted as arrows connecting the respective devices to the communication network 1109) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 11 to avoid overcomplicating the drawing. In some embodiments, communication network 1109 may correspond to service provider network 102. Networking equipment 111 may correspond to, for example, networking equipment 106, 108, and/or 122 of FIG. 1.

LAN networking equipment 1115 may correspond to, for example, networking equipment 106 and/or 108 (e.g., router, gateway, switch, and/or modem and/or other suitable equipment) of FIG. 1. LAN networking equipment 1115 may comprise control circuitry 1121, I/O path 1122, and storage 1124. WAN networking equipment 1117 may correspond to, for example, networking equipment 122 (e.g., a backbone or carrier router or CMTS other suitable networking equipment) of FIG. 1. WAN networking equipment 1117 may comprise control circuitry 11131, I/O path 1132, and storage 1134.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 1109.

System 1100 may comprise media content source 1102, one or more servers 1104, and/or one or more edge computing devices. In some embodiments, system or application may be executed at one or more of control circuitry 1111 of server 1104 (and/or control circuitry of computing devices 1107, 1108, 1110 and/or control circuitry of one or more edge computing devices). In some embodiments, media content source 1102 and/or server 1104 may be configured to facilitate network traffic between computing devices 1107, 1108, 1110 and/or any other suitable computing devices, and/or host or otherwise be in communication (e.g., over network 1109) with one or more application services. In some embodiments, cloud server 124 may correspond to, for example, media content source 1102 and/or server 1104. In some embodiments, server 1104 may perform actions to facilitate enforcement of data caps described herein.

In some embodiments, server 1104 may include control circuitry 1111 and storage 1114 (e.g., RAM, ROM, Hard Disk, Removable Disk, etc.). Storage 1114 may store one or more databases. Server 1104 may also include an input/output path 1112. I/O path 1112 may provide 3D object data, context data for the 3D environment, natural language descriptions, machine learning model inputs and/or outputs, device information, or other data, over a local area network (LAN) or wide area network (WAN), and/or other content and data to control circuitry 1111, which may include processing circuitry, and storage 1114. Control circuitry 1111 may be used to send and receive commands, requests, and other suitable data using I/O path 1112, which may comprise I/O circuitry. I/O path 1112 may connect control circuitry 1111 (and specifically control circuitry) to one or more communications paths.

Control circuitry 1111 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 1111 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1111 executes instructions for an emulation system application stored in memory (e.g., the storage 1114). Memory may be an electronic storage device provided as storage 1114 that is part of control circuitry 1111.

Figure 12:
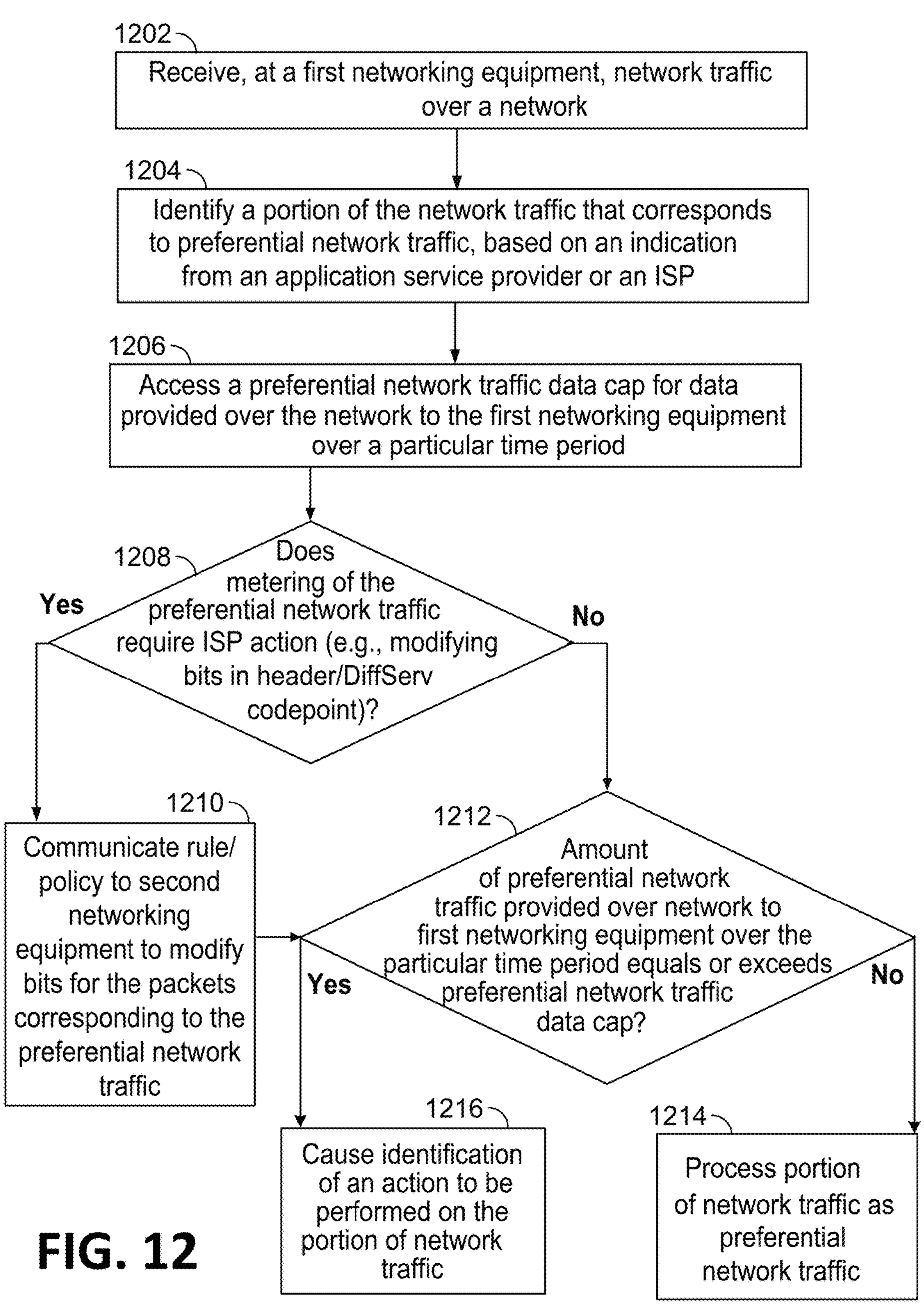
FIG. 12 is a flowchart of a detailed illustrative process for enforcing a data cap for preferential network traffic, in accordance with some embodiments of this disclosure.

FIG. 12 is a flowchart of a detailed illustrative process 1200 for enforcing a data cap for preferential network traffic, in accordance with some embodiments of this disclosure. In various embodiments, the individual steps of process 1200 may be implemented by one or more components of the devices, methods, and systems of FIGS. 1-11 and may be performed in combination with any of the other processes and aspects described herein. Although the present disclosure may describe certain steps of process 1200 (and of other processes described herein) as being implemented by certain components of the devices, methods, and systems of FIGS. 1-11, this is for purposes of illustration only, and it should be understood that other components of the devices, methods, and systems of FIGS. 1-11 may implement those steps instead.

At 1202, control circuitry (e.g., control circuitry 1121 of FIG. 11 of LAN networking equipment 1115 and/or control circuitry 1131 of WAN networking equipment 1117 of FIG. 11), I/O circuitry (e.g., 1002 of FIG. 10 and/or 1122 and 1132 of FIG. 11 of LAN networking equipment 1115 and WAN networking equipment 1117, respectively, of FIG. 11) and/or a network interface, may receive, at a first networking equipment, network traffic over a network (e.g., communication network 1109). The first networking equipment may comprise, for example, a router, modem, and/or gateway 106 and/or 108 of FIG. 1, which may correspond to networking equipment 115, and which may provide a LAN, and/or networking equipment 122 of FIG. 1, which may correspond to networking equipment 1117, on the WAN and configured to provide a first queue of a first service flow for low latency network traffic and a second queue of a second service flow for classic network traffic.

At 1204, the control circuitry (and/or the I/O circuitry and/or the network interface) may identify a portion of the network traffic at the first networking equipment (e.g., LAN networking equipment 1115) that corresponds to preferential network traffic, based on an indication from an application service provider or ISP. For example, the control circuitry may analyze header information, IP address information, source information, destination information, DPI (deep packet inspection), packet sizes, and interarrival times, and/or codepoint information of the network traffic, or may employ any other suitable technique, to determine whether the network traffic is L4S-capable (e.g., as marked or designated by an application service provider or an ISP). In some embodiments, the ISP may mark L4S-capable network traffic as preferential based at least in part on user preferences or user input received from a user (e.g., user 110 of location 104 of FIG. 1) associated with the first networking equipment (e.g., networking equipment 106 and/or 108 of FIG. 1). For example, the control circuitry may determine that network traffic is preferential network traffic designated by an application service provider based on ECN bits in a header of the network traffic having a pattern of 01 (codepoint name ECT(1)), as such bits may have been modified or inserted by the application service provider. As another example, the control circuitry may determine that network traffic is preferential network traffic designated by an ISP based on ECN bits in a header of the network traffic having a pattern of 10 (codepoint name ECT(0)), as such bits may have been modified or inserted by the ISP.

At 1206, the control circuitry (and/or the I/O circuitry and/or the network interface) may access a preferential network traffic data cap associated with the first networking equipment. For example, the data cap may be a certain amount of data (e.g., 100 GB or any other suitable amount of data) allocated for application service provider network traffic, ISP network traffic, or a combination thereof. In some embodiments, the data cap may be an amount of data permitted to be used during a particular period of time (e.g., a month or a year). In some embodiments, the data cap may be stored at one of more of the networking equipment or a remote server, and/or may be stored in association with user profiles or accounts, e.g., with an ISP. The process of FIG. 12 may be employed in any suitable type of network for which data caps may be imposed.

At 1208, the control circuitry may determine whether the metering of the preferential network traffic requires ISP action (e.g., modifying bits in header/DiffServ codepoint). For example, the control circuitry may determine that preferential traffic corresponding to customer preferred traffic is to be metered separately from preferential traffic designated as such by an application service provider. In some embodiments, the data cap may be an aggregate of both application service provider marked preferential network traffic and ISP marked preferential network traffic, or separate data caps may be employed for each of application service provider marked preferential network traffic and ISP marked preferential network traffic Upon determining, at 1208, that the network traffic is customer preferred, processing may proceed to 1210, where the first networking equipment associated with the LAN may transmit instructions to the second networking equipment associated with the WAN to change ECN bits in the header to correspond to the DiffServ codepoint (e.g., to ECT(0)) for such type of network traffic.

At 1212, the control circuitry may determine whether an amount of preferential network traffic associated with the first networking equipment at the LAN over the particular period of time equals or exceeds the preferential network data cap. For example, the amount of preferential network traffic (e.g., L4S-capable network traffic as marked by an application service provider and/or an ISP) may be determined based on performing a metering function for traffic tonnage (e.g., at cable modem 106 or router 108 or a gateway of FIG. 1), and/or WAN networking equipment (e.g., networking equipment 122 of FIG. 1). In some embodiments, the cable modem 106, router 108 and/or gateway may be owned by the ISP, to facilitate visibility into the network traffic at the LAN.

In some embodiments, the data caps may be enforced as a total (upstream and downstream tonnage) or separately for upstream tonnage and downstream tonnage. In some embodiments, data caps for the preferential network traffic and total network traffic associated with the LAN may be enforced separately for upstream and downstream, or as a total of upstream or downstream traffic. In some embodiments, the ISP may separately meter and enforce policy for three classes of traffic from (and to) application servers including regular non-L4S-capable traffic, L4S-capable traffic marked by an application service provider, and L4S-capable traffic marked by an ISP based on customer selection.

Upon determining at 1212 that the data cap is reached or exceed, processing may proceed to 1216; otherwise processing may proceed to 1214. At 1214, the control circuitry may process the network traffic identified at 1204 as preferential network traffic, e.g., using the first queue (e.g., the low latency L4S-capable queue as part of service flow 206, 210 of FIG. 2A), to provide latency priority and/or bandwidth priority to such traffic.

At 1216, the control circuitry and/or I/O circuitry and/or network interface may cause identification of an action to be performed on the preferential network traffic. For example, the first networking equipment (e.g., providing the LAN) may transmit an indication to the second networking equipment (e.g., on the WAN) of the action to be performed, or the second networking equipment may perform the determination at 1216 and identify the action to be performed.

For example, when a subscriber is determined to have met or exceeded a data cap for their preferred traffic, the ISP may perform an action such as, for example, mark or maintain a codepoint of ECT(1) in a header of a data packet of the network traffic, to continue to route the customer-designated preferred traffic to the preferred-traffic queue based on an agreement/SLA with the customer (e.g., for extra payment, movement to higher subscription tier), or re-route the preferred traffic back to the non-preferred traffic queue (e.g., mark the codepoint as non-ECT).

1216 may be performed by the first networking equipment (e.g., providing the LAN at location 104 of FIG. 1) and/or the second networking equipment (e.g., on the WAN). For example, the first networking equipment may cause the action to be identified by transmitting an indication to the second networking equipment that the preferential network data cap has been exceeded in relation to a particular customer associated with detected network traffic, to allow the second networking equipment to determine which action is to be taken and implement such action. In some embodiments, first networking equipment may signal to the second networking equipment that a client device does not support L4S, and thus should be processed using the classic service flow and queue for classic network traffic.

In some embodiments, when network traffic is ingested, a check may be performed to determine (e.g., based on an IP address of a source and destination) whether the data traffic is to stay inside the ISP's network or is to leave the operator's network. Based on this determination, one or more ECT bits may be modified or disabled.

In some embodiments, traffic may be marked as preferential network traffic by an ISP based on determining that the customer has made the choice to give this preferential treatment and the client-server of the application were capable of supporting L4S, e.g., responding to congestion control in a scalable manner. The control circuitry may determine whether one or more data caps (e.g., for preferential network traffic) are attained or exceeded, and based on determining, handle the traffic when data caps are attained or exceeded. For example, the SLA may allow a customer to continue to use the low latency queue for their preferred traffic even when the data cap tonnage is attained. Alternately, the L4S-capable traffic may be processed using the classic or default queue when the data cap is met. For example, the traffic analysis module 121 may provide the metering function, and signal to TIPE module 123 when a data cap is met, so that the TIPE module 123 can apply a new policy as defined by the SLA between the ISP and the customer. In some embodiments, application service providers may or may not allow a customer to prioritize traffic to a particular device or based on a particular service type.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, at a current time and at a first networking equipment, network traffic over a network;

identifying a portion of the network traffic that corresponds to preferential network traffic, based on an indication from an application service provider or an Internet service provider (ISP);

accessing a preferential network traffic data cap corresponding to a cumulative amount of data permitted to be used, during a predefined time period, for providing preferential network traffic over the network to the first networking equipment, wherein the predefined time period spans from a first prior time to a second future time, and wherein the first prior time is earlier than the current time and the second future time is later than the current time;

determining a total amount of data that has been used from the first prior time to the current time for providing preferential network traffic to the first networking equipment;

determining that the total amount of data that has been used from the first prior time to the current time for providing preferential network traffic to the first networking equipment equals or exceeds the cumulative amount of data corresponding to the preferential network traffic data cap; and based on determining that the total amount of data that has been used from the first prior time to the current time for providing preferential network traffic to the first networking equipment equals or exceeds the cumulative amount of data corresponding to the preferential network traffic data cap, causing identification of an action to be performed on the portion of the network traffic that corresponds to preferential network traffic.

2. The method of claim 1, wherein the first networking equipment is located at a particular location and provides a local area network (LAN) at the particular location, and second networking equipment is associated with providing a wide area network (WAN), the method further comprising:

transmitting an indication to the second networking equipment indicating that the total amount of data that has been used from the first prior time to the current time for providing preferential network traffic equals or exceeds the cumulative amount of data corresponding to the preferential network traffic data cap, wherein the indication causes the second networking equipment to perform the identification of the action to be performed.

3. The method of claim 1, wherein the first network equipment is associated with providing a wide area network (WAN), and the first network equipment causes the identification of the action to be performed.

4. The method of claim 1, wherein identifying the portion of the network traffic that corresponds to preferential network traffic comprises:

determining whether data associated with the portion of the network traffic comprises bits indicative of the portion of the network traffic being designated as preferential by the application service provider or the ISP.

5. The method of claim 4, wherein the portion of the network traffic designated as preferential by the application service provider or the ISP is low latency, low loss, and scalable throughput (L4S)-capable.

6. The method of claim 4, wherein determining the amount of preferential network traffic that has been used for providing preferential network traffic to the first networking equipment from the first prior time to the current time comprises determining an amount of at least one of network traffic designated as preferential by the application service provider or network traffic designated as preferential by the ISP provided to the first networking equipment from the first prior time to the current time.

7. The method of claim 4, wherein:

the portion of the network traffic is designated as preferential by the application service provider;

accessing the preferential network traffic data cap comprises accessing an application service provider preferential network traffic data cap corresponding to a cumulative amount of data permitted to be used, during the predefined time period, for network traffic designated as preferential by the application service provider; and determining that the total amount of preferential network traffic that has been used from the first prior time to the current time for providing preferential network traffic to the first networking equipment equals or exceeds the cumulative amount of data corresponding to the preferential network traffic data cap comprises determining whether the cumulative amount of application service provider network traffic designated as preferential provided to the first networking equipment from the first prior time to the current time equals or exceeds the application service provider preferential network traffic data cap.

8. The method of claim 4, wherein:

the portion of the network traffic is designated as preferential by the ISP;

accessing the preferential network traffic data cap comprises accessing an ISP preferential network traffic data cap corresponding to a cumulative amount of data permitted to be used, during the predefined time period, for providing network traffic designated as preferential by the ISP; and determining that the total amount of preferential network traffic that has been used from the first prior time to the current time for providing preferential network traffic to the first networking equipment equals or exceeds the cumulative amount of data corresponding to the preferential network traffic data cap comprises determining whether the cumulative amount of ISP network traffic designated as preferential by the ISP provided to the first networking equipment from the first prior time to the current time equals or exceeds the ISP preferential network traffic data cap.

9. The method of claim 4, wherein the first networking equipment is located at a particular location and provides a local area network (LAN) at the particular location, and at the least one bit is designated by the ISP as preferential based at least in part on input received from, or preferences indicated by, a user associated with first networking equipment.

10. The method of claim 4, wherein:

a first queue is provided to process preferential network traffic intended for or transmitted by the first networking equipment, and a second queue is provided to process non-preferential network traffic intended for or transmitted by the first networking equipment; and the identified action comprises modifying the bits to indicate that the portion of the network traffic is non-preferential network traffic, to cause the non-preferential network traffic to be transmitted via the second queue.

11. The method of claim 4, wherein:

a first queue is provided to process preferential network traffic intended for or transmitted by the first networking equipment, and a second queue is provided to process non-preferential network traffic intended for or transmitted by the first networking equipment; and the identified action comprises maintaining the portion of the network traffic as preferential network traffic, to cause the portion of the network traffic to be transmitted via the first queue.

12. The method of claim 4, wherein:

the portion of the network traffic is designated as preferential by the ISP; and the method further comprises maintaining the portion of the network traffic as preferential network traffic based on determining that an amount of current network traffic having bits indicative of the ISP designating the current network traffic as preferential is below a threshold.

13. The method of claim 4, wherein:

the portion of the network traffic is associated with a particular data provider;

second networking equipment, associated with providing a wide area network (WAN), is configured to receive an indication from the first networking equipment that the bits do not indicate that the portion of the network traffic is at least one of preferential or experiencing congestion, despite the second networking equipment having caused the bits to indicate that the portion of the network traffic is at least one of preferential or experiencing congestion; and the second networking equipment is configured to, based on receiving the indication from the first networking equipment that the bits do not indicate that the portion of the network traffic is preferential or experiencing congestion, refrain from causing subsequent network traffic from the particular data provider and intended for the first networking equipment to include an indication that the subsequent network traffic is at least one of preferential or experiencing congestion.

14. The method of claim 4, wherein determining whether the data associated with the portion of the network traffic comprises bits indicative of the portion of the network traffic being preferential network traffic comprises:

based on determining that the bits indicate that the portion of the network traffic is experiencing congestion, identifying a prior packet of the portion of the network traffic, and determining whether the prior packet of the portion of the network traffic comprises bits indicating whether the portion of the network traffic was designated as preferential by the application service provider or the ISP.

15. The method of claim 4, wherein second networking equipment is associated with the ISP and is further configured to:

ingest the network traffic;

determine whether the portion of the network traffic originated outside of the network of the ISP;

based on determining that the portion of the network traffic originated outside of the network of the ISP, determine whether the data associated with the portion of the network traffic comprises, in error, the bits indicative of the portion of the network traffic being preferential network traffic; and based on determining that the data associated with the portion of the network traffic comprises, in error, the bits indicative of the portion of the network traffic being preferential network traffic, modifying the bits to indicate that the portion of the network traffic is non-preferential network traffic.

16. The method of claim 1, wherein:

the current time corresponds to a time in a current day;

the first prior time, of the predefined time period corresponding to the preferential network traffic data cap, is at least one day prior to the current day; and the second future time, of the predefined time period corresponding to the preferential network traffic data cap, is at least one day subsequent to the current day.

17. A system comprising:

a first networking equipment; and control circuitry configured to:

receive, at a current time and at the first networking equipment, network traffic over a network;

identify a portion of the network traffic that corresponds to preferential network traffic, based on an indication from an application service provider or an Internet service provider (ISP);

access a preferential network traffic data cap corresponding to a cumulative amount of data permitted to be used, during a predefined time period, for providing preferential network traffic over the network to the first networking equipment, wherein the predefined time period spans from a first prior time to a second future time, and wherein the first prior time is earlier than the current time and the second future time is later than the current time;

determine a total amount of data that has been used from the first prior time to the current time for providing preferential network traffic to the first networking equipment;

determine that the total amount of data that has been used from the first prior time to the current time for providing preferential network traffic to the first networking equipment equals or exceeds the cumulative amount of data corresponding to the preferential network traffic data cap; and based on determining that the total amount of data that has been used from the first prior time to the current time for providing preferential network traffic to the first networking equipment equals or exceeds the cumulative amount of data corresponding to the preferential network traffic data cap, cause identification of an action to be performed on the portion of the network traffic that corresponds to preferential network traffic.

18. The system of claim 17, wherein the first networking equipment is located at a particular location and provides a local area network (LAN) at the particular location, and second networking equipment is associated with providing a wide area network (WAN), and the control circuitry is further configured to:

transmit an indication to the second networking equipment indicating that the total amount of data that has been used from the first prior time to the current time for providing preferential network traffic equals or exceeds the cumulative amount of data corresponding to the preferential network traffic data cap, wherein the indication causes the second networking equipment to perform the identification of the action to be performed.

19. The system of claim 17, wherein the first network equipment is associated with providing a wide area network (WAN), and the first network equipment causes the identification of the action to be performed.

20. The system of claim 17, wherein the control circuitry is further configured to identify the portion of the network traffic that corresponds to preferential network traffic by:

determining whether data associated with the portion of the network traffic comprises bits indicative of the portion of the network traffic being designated as preferential by the application service provider or the ISP.

* * * * *